US006724942B1

(12) United States Patent
Arai

(10) Patent No.: US 6,724,942 B1
(45) Date of Patent: Apr. 20, 2004

(54) IMAGE PROCESSING METHOD AND SYSTEM

(75) Inventor: Hisao Arai, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/577,341

(22) Filed: May 24, 2000

(30) Foreign Application Priority Data

| May 24, 1999 | (JP) | 11/143841 |
| Oct. 21, 1999 | (JP) | 11/299223 |
| Feb. 24, 2000 | (JP) | 2000/047570 |

(51) Int. Cl.[7] ............................................. G06K 9/40
(52) U.S. Cl. ........................ 382/254; 382/266; 382/275; 358/447; 358/463
(58) Field of Search ................................ 382/263, 264, 382/266, 275, 254, 260, 262, 308; 358/447, 448, 463

(56) References Cited

U.S. PATENT DOCUMENTS

| 4,812,903 | A | | 3/1989 | Wagensonner et al. ........ 358/80 |
| 5,563,963 | A | * | 10/1996 | Kaplan et al. ............... 382/266 |
| 5,739,922 | A | * | 4/1998 | Matama ....................... 358/447 |
| 5,973,111 | A | | 10/1999 | Bemis et al. ................. 530/330 |
| 6,014,474 | A | | 1/2000 | Takeo et al. ................. 382/308 |
| 6,055,340 | A | * | 4/2000 | Nagao ......................... 382/261 |
| 6,373,992 | B1 | * | 4/2002 | Nagao ......................... 382/266 |
| 6,384,937 | B1 | * | 5/2002 | Matama ....................... 358/1.9 |
| 6,445,831 | B1 | * | 9/2002 | Arai ............................ 382/254 |
| 6,628,842 | B1 | * | 9/2003 | Nagao ......................... 382/266 |
| 6,633,342 | B2 | * | 10/2003 | Kim ............................. 348/606 |

FOREIGN PATENT DOCUMENTS

| JP | 63-26783 | 2/1988 | ........... G06F/15/68 |
| JP | 9-91421 | 4/1997 | ............. G06T/5/20 |

OTHER PUBLICATIONS

Patent Abstract of Japan 63–026783 Feb. 4, 1998.
Patent Abstract of Japan 09–091421 Apr. 4, 1997.

* cited by examiner

Primary Examiner—Thomas D. Lee
(74) Attorney, Agent, or Firm—Sughrue Mion, PLLC

(57) ABSTRACT

An original image signal made up of a plurality of image signal components each representing a pixel of an original image is processed to suppress the granularity of the original image and enhance the sharpness of the original image, and a final processed image signal is obtained. Processing for suppressing granularity and processing for enhancing sharpness are carried out separately on the original image signal to obtain a granularity-suppressed image signal and a sharpness-enhanced image signal. At least one intermediate processed image signal is obtained by operation based on at least the granularity-suppressed image signal and the sharpness-enhanced image signal, and, as the image signal component for each pixel of the final processed image signal, the image signal component for the corresponding pixel of an image signal selected from the intermediate processed image signals and the original image signal is taken according to an indicator value calculated on the basis of the granularity-suppressed image signal, the sharpness-enhanced image signal and the original image signal.

28 Claims, 16 Drawing Sheets

F I G. 15A
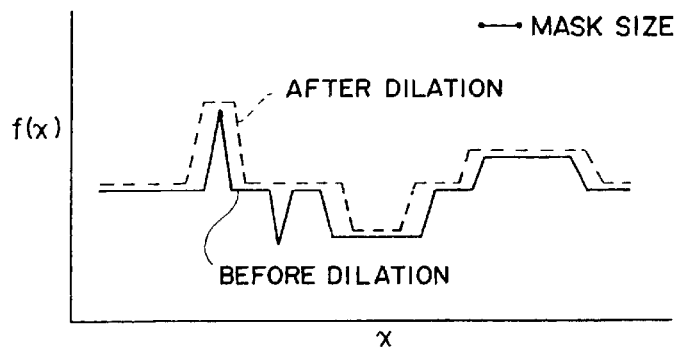
F I G. 15B
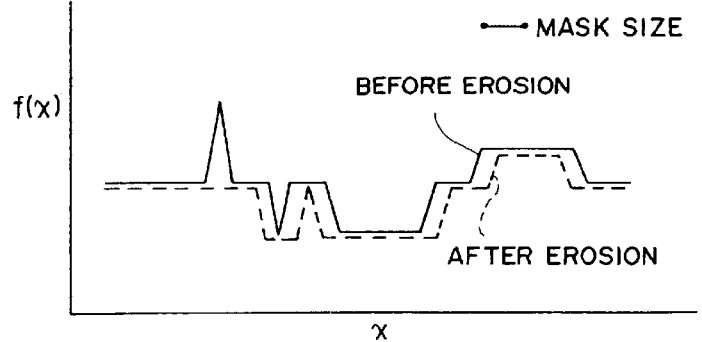
F I G. 15C
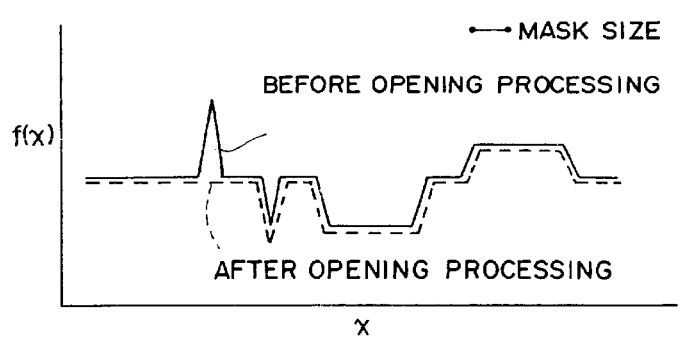
F I G. 15D
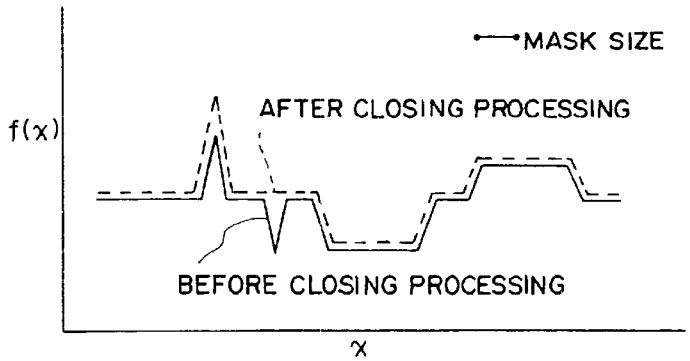

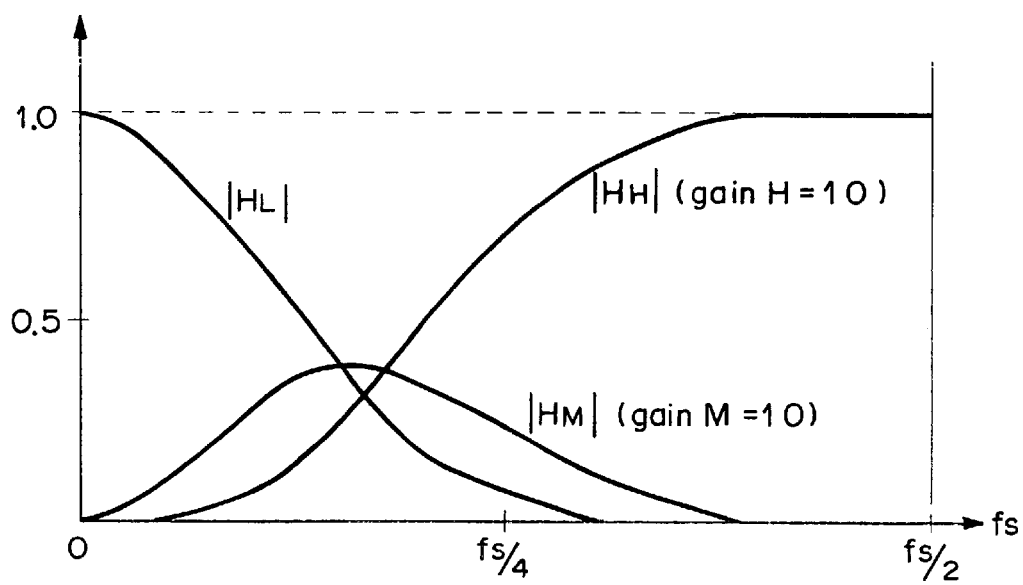
F I G . 16

IMAGE PROCESSING METHOD AND SYSTEM

BACKGROUND OF THE INVENTION

1. Field of the Invention

This invention relates to an image processing method and an image processing system, and more particularly to an image processing method of and an image processing system for processing an image to enhance sharpness while suppressing granularity (high frequency noise).

2. Description of the Related Art

There has been known a system in which an image signal is obtained by reading an image on a photographic film or a printed image (including a color image) by an image sensor such as a CCD, the image signal is variously processed and an image is printed or displayed on a CRT or the like on the basis of the processed image signal. Such image processing includes, for instance, frequency processing which acts on predetermined frequency components of the image, and gradation processing which acts on the density of the image.

As the frequency processing, sharpness enhancement processing for suppressing blur of the edges of an image, granularity suppressing processing such as smoothing processing for suppressing granularity due to the granularity value of the photosensitive material and the like have been known.

As the sharpness enhancement processing, there have been known unsharp masking processing, high frequency band enhancement filter processing, processing for enhancing high frequency components of the image while suppressing intermediate frequency components (Japanese Unexamined Patent Publication No. 9(1997)-22460), and the like. As the granularity suppressing processing, there have been known, for instance, a median filter processing, hysteresis smoothing processing, noise removing processing by repetition, and granularity suppressing processing using morphology operation.

When the sharpness enhancement processing is carried out, granularity of the image is also enhanced though the sharpness of the image is improved, whereas when the granularity suppressing processing is carried out, the sharpness of the image is deteriorated though the granularity of the image is suppressed.

Accordingly, there has been a demand for image processing which can enhance the sharpness of the image while suppressing the granularity of the image, and there have been proposed various processings which can enhance the sharpness of the image and at the same time can suppress the granularity of the image as disclosed, for instance, in U.S. Pat. No. 4,812,903 and Japanese Unexamined Patent Publication Nos. 63(1988)-26783 and 9(1997)-22460. However, it should be said that the conventional techniques fail in effectively realizing enhancement of the sharpness together with suppression of the granularity.

For example, the technique disclosed in Japanese Unexamined Patent Publication No. 9(1997)-22460 tries to realize enhancement of the sharpness together with suppression of the granularity by enhancing high frequency components which affect the sharpness of the image and at the same time suppressing intermediate frequency components which affect the granularity of the image. This technique utilizes the fact that the granular portion is low in the degree of correlation with color and the image signal (edge) portion is high in the degree of correlation with color. In this technique, the image is developed into frequency ranges and the strength of intermediate to high frequency components is controlled so that the portion which is low in the degree of correlation with color is less enhanced, thereby suppressing the granularity. However in this processing, since continuity between adjacent pixels in a real image is not taken into account, abrupt change in the degree of control occurs in some part of the image, where the granularity cannot be sufficiently suppressed. Accordingly, this processing fails in effectively suppressing the granularity though it can effectively enhance the sharpness.

SUMMARY OF THE INVENTION

In view of the foregoing observations and description, the primary object of the present invention is to provide an image processing method and system which can effectively realize enhancement of the sharpness together with suppression of the granularity.

The image processing method and system of the present invention are characterized in that processing for suppressing granularity and processing for enhancing sharpness are separately carried out on an original image signal to obtain a granularity-suppressed image signal and a sharpness-enhanced image signal, at least one intermediate processed image signal is obtained by processing the image signal components of the granularity-suppressed image signal and the sharpness-enhanced image signal as well as the original image signal, as required, in one-to-one correspondence, and as the image signal component for each pixel of the final processed image signal, the image signal component for the corresponding pixel of an image signal selected from the original image signal and the intermediate processed image signal(s) is taken according to an indicator value defined by the granularity-suppressed image signal, the sharpness-enhanced image signal and the original image signal.

That is, in accordance with one aspect of the present invention, there is provided a method of processing an original image signal $f_{in}$ made up of a plurality of image signal components each representing a pixel of an original image (inclusive of a color image) to suppress the granularity of the original image and enhance the sharpness of the original image, and thereby obtaining a final processed image signal $f_{out}$, the method comprising the steps of carrying out processing for suppressing granularity and processing for enhancing sharpness separately on the original image signal $f_{in}$ to obtain a granularity-suppressed image signal f1 and a sharpness-enhanced image signal f2, obtaining at least one intermediate processed image signal f3 (f4, f5, . . . ) by operation based on at least the granularity-suppressed image signal and the sharpness-enhanced image signal, and taking, as the image signal component for each pixel of the final processed image signal $f_{out}$, the image signal component for the corresponding pixel of an image signal selected from the intermediate processed image signal(s) f3 and the original image signal $f_{in}$ according to an indicator value k(f1, f2, $f_{in}$) calculated on the basis of the granularity-suppressed image signal f1, the sharpness-enhanced image signal f2 and the original image signal $f_{in}$.

In this specification, $f_{in}$, f1, f2, $f_{out}$ and the like are sometimes used to denote image signal components of the corresponding image signals, which will be apparent to those skilled in the art. As the indicator value k(f1, f2, $f_{in}$), for instance, (f1−$f_{in}$)·(f2−$f_{in}$) may be used. In the case where one intermediate processed image signal f3 is obtained, the image signal component of the original image signal $f_{in}$ is taken as the image signal component of the final processed image signal $f_{out}$ when the indicator value $(f1-f_{in})\cdot(f2-f_{in})$ is smaller than 0, and the image signal component of the intermediate processed image signal f3 is taken as the image signal component of the final processed image signal $f_{out}$ when the indicator value $(f1-f_{in})\cdot(f2-f_{in})$ is not smaller than 0 as represented by the following formula (1).

In the case where a pair of intermediate processed image signals f3 and f4 are obtained, the image signal component of the first intermediate processed image signal f3 is taken as the image signal component of the final processed image signal $f_{out}$ when the indicator value $(f1-f_{in})\cdot(f2-f_{in})$ is smaller than 0, and the image signal component of the second intermediate processed image signal f4 is taken as the image signal component of the final processed image signal $f_{out}$ when the indicator value $(f1-f_{in})\cdot(f2-f_{in})$ is not smaller than 0 as represented by the following formula (4).

$$f_{out} = \begin{cases} f_{in} & \text{(when } (f1-f_{in})\cdot(f2-f_{in}) < 0), \\ f3 & \text{(when } (f1-f_{in})\cdot(f2-f_{in}) \geq 0) \end{cases} \quad (1)$$

wherein $f_{in}$ represents the original image signal, f1 represents the granularity-suppressed image signal, f2 represents the sharpness-enhanced image signal, and f3 represents the intermediate processed image signal.

$$f_{out} = \begin{cases} f3 & \text{(when } (f1-f_{in})\cdot(f2-f_{in}) < 0), \\ f4 & \text{(when } (f1-f_{in})\cdot(f2-f_{in}) \geq 0) \end{cases} \quad (4)$$

wherein $f_{in}$ represents the original image signal, f1 represents the granularity-suppressed image signal, f2 represents the sharpness-enhanced image signal, f3 represents the first intermediate processed image signal, and f4 represents the second intermediate processed image signal.

That is, formula (1) represents processing in which the image signal component of the intermediate processed image signal f3 is taken as the image signal component of the final processed image signal $f_{out}$ when both the image signal components of the granularity-suppressed image signal f1 and the sharpness-enhanced image signal f2 are larger or smaller than the image signal component of the original image signal $f_{in}$ or when the image signal component of at least one of the granularity-suppressed image signal f1 and the sharpness-enhanced image signal f2 is equal to the image signal component of the original image signal $f_{in}$, and the image signal component of the original image signal $f_{in}$ is taken as the image signal component of the final processed image signal $f_{out}$ when the image signal component of one of the granularity-suppressed image signal f1 and the sharpness-enhanced image signal f2 is smaller than the image signal component of the original image signal $f_{in}$ and the image signal component of the other of the granularity-suppressed image signal f1 and the sharpness-enhanced image signal f2 is larger than the image signal component of the original image signal $f_{in}$. At portions such as an edge portion of an image where the density abruptly changes, the indicator value $(f1-f_{in})\cdot(f2-f_{in})$ is generally not smaller than 0 $((f1-f_{in})\cdot(f2-f_{in})\geq 0)$, and accordingly the intermediate processed image signal f3 where the sharpness is higher than the original image signal $f_{in}$ is selected. On the other hand, at the other portions (e.g., flat density portions), the indicator value $(f1-f_{in})\cdot(f2-f_{in})$ is generally smaller than 0 $((f1-f_{in})\cdot(f2-f_{in})<0)$, and accordingly, the original image signal $f_{in}$ is selected since sufficient granularity suppressing effect cannot be obtained with the intermediate processed image signal f3 which is a weighted average of the granularity-suppressed image signal f1 and the sharpness-enhanced image signal f2. In this case, by selecting the original image signal $f_{in}$, a granularity-suppressed final processed image signal $f_{out}$ can be obtained. Thus, the granularity of the image can be suppressed without deteriorating the sharpness of the edge portion and the like.

In the case where three intermediate processed image signals f3, f4 and f5 are obtained, the image signal component of one of the first to third intermediate processed image signal f3, f4 and f5 is taken as the image signal component of the final processed image signal $f_{out}$ according to whether the indicator value $k(f1, f2, f_{in})$ is positive or negative and the value of $|f_{in}-f1|$ as represented by the following formula (15).

$$f_{out}=f3 \text{ (when } |fin-f1|\geq Th)$$
$$f_{out}=f4 \text{ (when } |fin-f1|<Th \text{ and } (f1-fin)\cdot(f2-fin)<0)$$
$$f_{out}=f5 \text{ (when } |fin-f1|<Th \text{ and } (f1-fin)\cdot(f2-fin)\geq 0) \quad (15)$$

wherein $f_{in}$ represents the original image signal, f1 represents the granularity-suppressed image signal, f2 represents the sharpness-enhanced image signal, f3 represents the first intermediate processed image signal, f4 represents the second intermediate processed image signal, f5 represents the third intermediate processed image signal, and Th represents a constant.

The operation for obtaining the intermediate processed image signal f3 may be selected from a plurality of kinds of preset operations according to the relation between the intermediate processed image signal f3 and the original image signal $f_{in}$, the kind of the image and/or the position of the pixel, or may be input from the external for each processing. Specifically the operation is preferably that defined by the following formula (2) which is based on the granularity-suppressed image signal f1 and the sharpness-enhanced image signal f2, or that defined by the following formula (3) which is based on the granularity-suppressed image signal f1, the sharpness-enhanced image signal f2 and the original image signal $f_{in}$.

$$f3=w1\cdot f1+w2\cdot f2 \quad (2)$$

wherein w1+w2=1 (0<w1<1, 0<w2<1), f1 represents the granularity-suppressed image signal, f2 represents the sharpness-enhanced image signal and f3 represents the intermediate processed image signal.

$$f3=\{|f1-f_{in}|(f1-f_{in})+|f2-f_{in}|(f2-f_{in})\}/\{|f1-f_{in}|+|f2-f_{in}|\}+f_{in} \quad (3)$$

wherein $f_{in}$ represents the original image signal, f1 represents the granularity-suppressed image signal, f2 represents the sharpness-enhanced image signal and f3 represents the intermediate processed image signal.

That is, in accordance with formula (2), the intermediate processed image signal f3 is obtained by weighted addition of the granularity-suppressed image signal f1 and the sharpness-enhanced image signal f2, and by weighted average of the granularity-suppressed image signal f1 and the sharpness-enhanced image signal f2, the sharpness can be enhanced while suppressing the granularity. Also in this operation, the weighting factors w1 and w2 may be changed pixel to pixel according to the relation between the intermediate processed image signal f3 and the original image signal $f_{in}$, or the like, or may be common to all the pixels.

Further each of the weighting factors w1 and w2 is preferably 0.2 to 0.8, more preferably 0.3 to 0.7 and most preferably 0.4 to 0.6.

In accordance with formula (3), the image signal components of the sharpness-enhanced image signal f2 are taken as the image signal components of the intermediate processed image signal f3 for pixels where the image signal components of the granularity-suppressed image signal f1 are equal to those of the original image signal $f_{in}$, the image signal components of the granularity-suppressed image signal f1 are taken as the image signal components of the intermediate processed image signal f3 for pixels where the image signal components of the sharpness-enhanced image signal f2 are equal to those of the original image signal $f_{in}$, and values obtained by weighting the differences between the image signal components of the granularity-suppressed image signal f1 and the original image signal $f_{in}$ and between the image signal components of the sharpness-enhanced image signal f2 and the original image signal f1 and adding the weighted differences are taken as the image signal components of the intermediate processed image signal f3 for pixels where the image signal components of neither of the granularity-suppressed image signal f1 and the sharpness-enhanced image signal f2 are equal to those of the original image signal $f_{in}$. With this operation, for the image signal components for pixels in the flat density portion (an area of the image where change of the density or brightness is less) where the granularity is more apt to be remarked than the sharpness, the image signal components of the granularity-suppressed image signal f1 is more weighted and accordingly the granularity can be suppressed. To the contrast, for the image signal components for pixels in the edge portion (an area of the image where change of the density or brightness is sharp) where the sharpness is more apt to be remarked than the granularity, the image signal components of the sharpness-enhanced image signal f2 is more weighted and accordingly the sharpness can be enhanced. This operation is a specific example of the operation where processing is selected pixel to pixel according to the relation with the original image signal $f_{in}$.

Formula (4) represents processing in which the image signal component of the second intermediate processed image signal f4 is taken as the image signal component of the final processed image signal $f_{out}$ when both the image signal components of the granularity-suppressed image signal f1 and the sharpness-enhanced image signal f2 are larger or smaller than the image signal component of the original image signal $f_{in}$ or when the image signal component of at least one of the granularity-suppressed image signal f1 and the sharpness-enhanced image signal f2 is equal to the image signal component of the original image signal $f_{in}$ (k≧0), and the image signal component of the first intermediate processed image signal f3 is taken as the image signal component of the final processed image signal $f_{out}$ when the image signal component of one of the granularity-suppressed image signal f1 and the sharpness-enhanced image signal f2 is smaller than the image signal component of the original image signal $f_{in}$ and the other of the image signal components of the granularity-suppressed image signal f1 and the sharpness-enhanced image signal f2 is larger than the image signal component of the original image signal $f_{in}$ (k<0).

It is preferred that the degree of granularity suppression of the first intermediate processed image signal f3 be higher than that of the second intermediate processed image signal f4, and the degree of sharpness enhancement of the second intermediate processed image signal f4 be higher than that of the first intermediate processed image signal f3. At portions such as an edge portion of an image where the density abruptly changes, the indicator value k is generally not smaller than 0 (k≧0), and accordingly by selecting the second intermediate processed image signal f4 which is higher than the first intermediate processed image signal f3 in the degree of sharpness enhancement, the edge portion can be prevented from becoming unsharp. On the other hand, at the other portions (e.g., flat density portions), the indicator value k is generally smaller than 0 (k<0) and the granularity is apt to be remarked, and accordingly, by selecting the first intermediate processed image signal f3 which is higher than the second intermediate processed image signal f4 in the degree of granularity suppression, the granularity can be suppressed.

It is preferred that the first and second intermediate processed image signals f3 and f4 be obtained by weighting the granularity-suppressed image signal f1 and the sharpness-enhanced image signal f2 with weighting factors w1a, w1b, w2a and w2b and adding the weighted image signals f1 and f2 as represented by the following formulae (5) and (6).

$$f3 = w1a \cdot f1 + w1b \cdot f2 \quad (5)$$

$$f4 = w2a \cdot f1 + w2b \cdot f2 \quad (6)$$

wherein w1a+w1b=1 (0≦w1a≦1, 0≦w1b≦1), w2a+w2b=1 (0≦w2a≦1, 0≦w2b≦1), f1 represents the granularity-suppressed image signal, f2 represents the sharpness-enhanced image signal, f3 represents the first intermediate processed image signal, and f4 represents the second intermediate processed image signal.

It is preferred that the weighting factors w1a, w1b, w2a and w2b in the formulae (5) and (6) be changed depending on the original image signal $f_{in}$. For example, in the case of an original image signal $f_{in}$ which is set so that the density is increased as the value of the image signal component increases, it is preferred that the weighting factors w1a, w1b, w2a and w2b be defined by the following formulae (7) to (10), or by the following formulae (11) to (14).

$$w1a = 1 - (c\alpha + t)/C \quad (7)$$

$$w1b = (c\alpha + t)/C \quad (8)$$

$$w2a = (c\alpha + t)/C \quad (9)$$

$$w2b = 1 - (c\alpha + t)/C \quad (10)$$

wherein
t=(|f2−$f_{in}$|)/{(|f1−$f_{in}$|)(|f2−$f_{in}$|)},
α=$f_{in}$/f0,
$f_{in}$=an original image signal,
f0=a reference value,
c=a constant, and
C=a constant.

$$w1a = \{c(1-\alpha)+t\}/C \quad (11)$$

$$w1b = 1 - \{c(1-\alpha)+t\}/C \quad (12)$$

$$w2a = 1 - (c\alpha + t)/C \quad (13)$$

$$w2b = (c\alpha + t)/C \quad (14)$$

wherein
t=(|f2−$f_{in}$|)/{(|f1−$f_{in}$|)(|f2−$f_{in}$|)},
α=$f_{in}$/f0,
$f_{in}$=an original image signal,
f0=a reference value,
c=a constant, and
C=a constant.

That is, according to the formulae (7) to (10), or the formulae (11) to (14), the weighting factors w1a and w1b for the first intermediate processed image signal f3 are set so that the weight on the granularity-suppressed image signal f1 becomes larger as the image signal component of the original image signal $f_{in}$ becomes smaller, and the weighting factors w2a and w2b for the second intermediate processed image signal f4 are set so that the weight on the sharpness-enhanced image signal f2 becomes larger as the image signal component of the original image signal $f_{in}$ becomes smaller.

When the weighting factors are set in this manner, in the first intermediate processed image signal f3 which is selected as the final processed image signal $f_{out}$ for a flat density portion according to formula (4), the granularity is more suppressed at a high density portion than a low density portion. Since the granularity is generally bad at a high density portion in an image, the granularity can be effectively suppressed by more suppressing the granularity at a high density portion.

The weighting factors w1a, w1b, w2a and w2b set according to formulae (11) to (14) are preferably applied to a region where the granularity is very bad. In this case, it is preferred that the constants c and C be set in a range $c \leq C < (c+1)$ or $c < C \leq (c+1)$ in a region where the values of the image signal components of the original image signal $f_{in}$ are relatively small so that w1a>w1b and w2a>w2b are satisfied, i.e., so that the weight on the granularity-suppressed image signal f1 is larger than that on the sharpness-enhanced image signal f2 in the region for both the intermediate processed image signals f3 and f4 (provided that the first intermediate processed image signal f3 is higher than the second intermediate processed image signal f4 in the degree of granularity suppression).

The reference value f0, which determines α in the formulae (7) to (14), may be, for instance, a maximum value of the image signal components of the original image signal $f_{in}$ (1023 in the case where the original image signal $f_{in}$ is expressed in 10 bits) or 90% of the maximum value. Further it is preferred that the constant C is larger than the constant c.

Formula (15) represents processing in which the image signal component of the first intermediate processed image signal f3 is taken as the image signal component of the final processed image signal $f_{out}$ when the difference ($|f_{in}-f1|$) between the image signal components of the original image signal $f_{in}$ and the granularity-suppressed image signal f1 is not smaller than a predetermined threshold value Th, the image signal component of the third intermediate processed image signal f5 is taken as the image signal component of the final processed image signal $f_{out}$ when the difference ($|f_{in}-f1|$) is smaller than the threshold value Th and the image signal components of both the granularity-suppressed image signal f1 and the sharpness-enhanced image signal f2 are not smaller than the image signal component of the original image signal $f_{in}$ (k≧0), and the image signal component of the second intermediate processed image signal f4 is taken as the image signal component of the final processed image signal $f_{out}$ when the difference ($|f_{in}-f1|$) is smaller than the threshold value Th, the image signal component of one of the granularity-suppressed image signal f1 and the sharpness-enhanced image signal f2 is larger than that of the original image signal $f_{in}$, and the image signal component of the other of the granularity-suppressed image signal f1 and the sharpness-enhanced image signal f2 is smaller than that of the original image signal $f_{in}$ (k<0).

In this case, the first intermediate processed image signal f3 is generated as an image signal having a sharpness between that of the original image signal $f_{in}$ and that of the sharpness-enhanced image signal f2.

According to formula (15), the first intermediate processed image signal f3 which is substantially equivalent in sharpness to the original image signal $f_{in}$ in which the granularity is not suppressed or to the sharpness-enhanced image signal f2 in which the sharpness is relatively high, is selected for image portions such as an image of catchlights (external light reflected at a pupil) where the difference ($|f_{in}-f1|$) is larger than the threshold value Th is selected, whereby the image portions such as the image of catchlights can be left there and the image can be rich in expression.

It is preferred that the second intermediate processed image signal f4 be higher in the degree of granularity suppression than the third intermediate processed image signal f5 and the third intermediate processed image signal f5 be higher in the degree of sharpness enhancement than the second intermediate processed image signal f4. At portions such as an edge portion of an image where the density abruptly changes, the indicator value k is generally not smaller than 0 (k>0), and accordingly by selecting the third intermediate processed image signal f5 which is higher than the second intermediate processed image signal f4 in the degree of sharpness enhancement, the edge portion can be prevented from becoming unsharp. On the other hand, at the other portions (e.g., flat density portions), the indicator value k is generally smaller than 0 (k<0) and the granularity is apt to be remarked, and accordingly, by selecting the second intermediate processed image signal f4 which is higher than the third intermediate processed image signal f5 in the degree of granularity suppression, the granularity can be suppressed.

It is preferred that the first to third intermediate processed image signals f3, f4 and f5 be obtained by weighting the granularity-suppressed image signal f1 (or the original image signal $f_{in}$) and the sharpness-enhanced image signal f2 with weighting factors w3a, w3b, w4a, w4b, w5a and w5b, and adding the weighted image signal f1 (or the weighted original image signal $f_{in}$) and the weighted image signal f2 as represented by the following formulae (16) to (18).

$$f3 = w3a \cdot f1 + w3b \cdot f2 \tag{16}$$

$$f4 = w4a \cdot f1 + w4b \cdot f2 \tag{17}$$

$$f5 = w5a \cdot f1 + w5b \cdot f2 \tag{18}$$

wherein w3a+w3b=1 (0≦w3a≦1, 0≦w3b≦1), w4a+w4b=1 (0≦w4a≦1, 0≦w4b≦1), w5a+w5b=1 (0≦w5a≦1, 0≦w5b≦1), f1 represents the granularity-suppressed image signal, f2 represents the sharpness-enhanced image signal, f3 represents the first intermediate processed image signal, f4 represents the second intermediate processed image signal, and f5 represents the third intermediate processed image signal.

It is preferred that the weighting factors w4a, w4b, w5a and w5b in the formulae (16) to (18) be changed depending on the original image signal $f_{in}$. For example, in the case of an original image signal $f_{in}$ which is set so that the density is increased as the value of the image signal component increases, it is preferred that the weighting factors w4a, w4b, w5a and w5b be defined by the following formulae (19) to (22), or by the following formulae (23) to (26).

$$w4a = 1 - (c\alpha + t)/C \tag{19}$$

$$w4b = (c\alpha + t)/C \tag{20}$$

$$w5a = (c\alpha + t)/C \tag{21}$$

$$w5b = 1 - (c\alpha + t)/C \tag{22}$$

wherein $t=(|f2-f_{in}|)/\{(|f1-f_{in}|)(|f2-f_{in}|)\}$, $\alpha=f_{in}/f0$, $f_{in}$=an original image signal, f0=a reference value, c=a constant, and C=a constant.

$$w4a=\{c(1-\alpha)+t\}/C \tag{23}$$

$$w4b=1-\{c(1-\alpha)+t\}/C \tag{24}$$

$$w5a=1-(c\alpha+t)/C \tag{25}$$

$$w5b=(c\alpha+t)/C \tag{26}$$

wherein $t=(|f2-f_{in}|)/\{(|f1-f_{in}|)(|f2-f_{in}|)\}$, $\alpha=f_{in}/f0$, $f_{in}$=an original image signal, f0=a reference value, c=a constant, and C=a constant.

That is, according to the formulae (19) to (22), or the formulae (23) to (26), the weighting factors w4a and w4b for the second intermediate processed image signal f4 are set so that the weight on the granularity-suppressed image signal f1 becomes larger as the image signal component of the original image signal $f_{in}$ becomes smaller, and the weighting factors w5a and w5b for the third intermediate processed image signal f5 are set so that the weight on the sharpness-enhanced image signal f2 becomes larger as the image signal component of the original image signal $f_{in}$ becomes smaller.

When the weighting factors are set in this manner, in the second intermediate processed image signal f4 which is selected as the final processed image signal $f_{out}$ for a flat density portion according to formula (15), the granularity is more suppressed at a high density portion than a low density portion. Since the granularity is generally bad at a high density portion in an image, the granularity can be effectively suppressed by more suppressing the granularity at a high density portion.

The weighting factors w4a, w4b, w5a and w5b set according to formulae (23) to (26) are preferably applied to a region (e.g., extremely underexposed portion) where the granularity is very bad. In this case, it is preferred that the constants c and C be set in a range $c \leq C < (c+1)$ or $c < C \leq (c+1)$ in a region where the values of the image signal components of the original image signal $f_{in}$ are relatively small so that w4a>w4b and w5a>w5b are satisfied, i.e., so that the weight on the granularity-suppressed image signal f1 is larger than that on the sharpness-enhanced image signal f2 in the region for both the intermediate processed image signals f4 and f5 (provided that the second intermediate processed image signal f4 is higher than the third intermediate processed image signal f5 in the degree of granularity suppression).

The reference value f0, which determines a in the formulae (19) to (26), may be, for instance, a maximum value of the image signal components of the original image signal $f_{in}$ (1023 in the case where the original image signal $f_{in}$ is expressed in 10 bits) or 90% of the maximum value. Further it is preferred that the constant C is larger than the constant c.

As the granularity suppressing image processing, there can be used, for instance, a median filter processing, hysteresis smoothing processing, noise removing processing by repetition, and granularity suppressing processing (smoothing) using morphology operation. As the sharpness enhancement image processing, there can be used, for instance, unsharp masking processing, high frequency band enhancement filter processing, and processing in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal (Japanese Unexamined Patent Publication No. 9(1997)-22460). However a combination of the granularity suppressing processing using morphology operation and the processing in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal (Japanese Unexamined Patent Publication No. 9(1997)-22460) is optimal.

Though the morphology operation is generally developed as a set theory in an N-dimensional space, it is often applied to images which are two-dimensional spaces. See, for instance, Japanese Unexamined Patent Publication Nos. 8(1996)-272961, 9(1997)-248291 and 9(1997)-91421. The morphology operation will be briefly described on a light and shade image by way of example.

Considering a light and shade image as a space where a point (x, y) has a height corresponding to a density value f(x, y), and a one-dimensional function f(x) corresponding a cross-section of the space will be discussed.

It is assumed that structure element g employed in the morphology operation is a symmetric function symmetrical about the origin as represented by the following formula (28) and is 0 in value in its domain G which is defined by the following formula (29).

$$g^s(X)=g(-X) \tag{28}$$

$$G=\{-m, -m+1, \ldots, -1, 0, 1, \ldots, m-1, m\} \tag{29}$$

At this time, the basic of the morphology operation is very simple as represented by the following formula (30) to (33).

$$\text{dilation}; [f \oplus G^s](i)=\max\{f(i-m), \ldots, f(i), \ldots, f(i+m)\} \tag{30}$$

$$\text{erosion}; [f \ominus G^s](i)=\min\{f(i-m), \ldots, f(i), \ldots, f(i+m)\} \tag{31}$$

$$\text{opening}; f_g=(f \ominus g^s)\oplus g \tag{32}$$

$$\text{closing}; f^g=(f \oplus g^s)\ominus g \tag{33}$$

The dilation processing is for searching the maximum value in a range of ±m (a value determined depending on structure element B and corresponding the mask size in FIGS. 15A to 15D) about an object pixel (See, FIG. 15A), while the erosion processing is for searching the minimum value in the range of ±m about the object pixel (See, FIG. 15B). The opening processing is for performing the dilation processing after the erosion processing, that is, for searching the value maximum after search of the minimum value, and the closing processing is for performing the erosion processing after the dilation processing, that is, for searching the minimum value after search of the maximum value.

In other words, the opening processing smoothes the density curve f(X) from the low density side and suppresses density projection portions (portions higher in density than a surrounding portion) at which the density fluctuates within a range which is spatially narrower than the mask size 2m (FIG. 15C). To the contrast, the closing processing smoothes the density curve f(X) from the high density side and suppresses density recession portions (portions lower in density than a surrounding portion) at which the density fluctuates within a range which is spatially narrower than the mask size 2m (FIG. 15D).

In a high-density high-signal-level image signal, the signal level increases as the density increases whereas in a high-brightness high-signal-level image signal, the signal level increases as the brightness increases. Accordingly, the dilation processing for the high-density high-signal-level image signal is equivalent to the erosion processing for the high-brightness high-signal-level image signal (FIG. 15B), the erosion processing for the high-density high-signal-level image signal is equivalent to the dilation processing for the high-brightness high-signal-level image signal (FIG. 15A), the opening processing for the high-density high-signal-level image signal is equivalent to the closing processing for the high-brightness high-signal-level image signal (FIG. 15D), and the closing processing for the high-density high-signal-level image signal is equivalent to the opening processing for the high-brightness high-signal-level image signal (FIG. 15C).

By carrying out the opening processing or the closing processing by the morphology operation on an image signal representing an original image, granularity of the image (noise in the image signal) can be suppressed or removed. ("Morphology" by Obata, CORONA)

When granularity suppressing processing using morphology operation is employed in the image processing method of the present invention, it is preferred that granularity suppressing defined by the following formula (27) be employed.

$$f1 = \begin{cases} f_{opn} & \text{(when } f_{cls} = f_{in}) \\ f_{cls} & \text{(when } f_{opn} = f_{in}) \\ (f_{opn} + f_{cls})/2 & \text{(when } f_{cls} \neq f_{in}, \text{ and } f_{opn} \neq f_{in}) \end{cases} \quad (27)$$

wherein f1: granularity-suppressed image signal, $f_{cls}$: closing image signal, $f_{opn}$: opening image signal, $f_{in}$: original image signal.

When granularity suppressing processing using morphology operation is employed, portions such as an edge portion of an image where the density abruptly changes are substantially perfectly reserved (kept as they are), and accordingly, (f1−$f_{in}$)) in formulae (1), (4) and (15) is substantially constantly not smaller than 0 and the indicator value k is not smaller than 0.

The sharpness enhancement processing by enhancing high frequency components of the image while suppressing intermediate frequency components disclosed in Japanese Unexamined Patent Publication No. 9(1997)-22460will be briefly described, hereinbelow.

In this processing, an image signal is separated into a low frequency component, an intermediate frequency component and a high frequency component, enhancement/suppression processing in which the high frequency component is enhanced and the intermediate frequency component is suppressed is carried out, and the processed high frequency component, the processed intermediate frequency component and the low frequency component are combined into a final processed image signal $f_{out}$.

The low frequency component, intermediate frequency component and high frequency component are those distributed as shown in FIG. 16. The intermediate frequency component is distributed with a peak near ⅓ of a Nyquist frequency of output for reproducing the final processed image signal $f_{out}$ as a visible image, the low frequency component is distributed with a peak at a frequency at which the Nyquist frequency of the output becomes 0, and the high frequency component is distributed with a peak at the Nyquist frequency of the output. The sum of the low frequency component, the intermediate frequency component and the high frequency component is 1 at each frequency.

In this processing, it is preferred that brightness components be extracted from the separated high and intermediate frequency components and said enhancement/suppression processing and said combination processing be carried out on the basis of only the brightness components.

Further, in this processing, it is preferred that a particular color region of the image be extracted and the intermediate component fraction corresponding to the particular color region be further suppressed in the enhancement/suppression processing.

Further, in this processing, it is preferred that an evaluation value of the intermediate frequency component and/or the high frequency component be obtained after the image signal is separated into the low frequency component, the intermediate frequency component and the high frequency component, and the intermediate frequency component for a pixel the evaluation value for which is smaller than a predetermined threshold value be more suppressed in the enhancement/suppression processing than the intermediate frequency component for a pixel the evaluation value for which is larger than the predetermined threshold value. In this case, it is further preferred that the high frequency component for the pixel the evaluation value for which is smaller than the predetermined threshold value be less enhanced in the enhancement/suppression processing than the high frequency component for the pixel the evaluation value for which is larger than the predetermined threshold value.

The "evaluation value" as used here means, for instance, at least one of correlation values between twos of red, green and blue, a value of local dispersion of the frequency components of the image signal.

Further, it is preferred that the evaluation value be at least one of correlation values between twos of red, green and blue of the intermediate frequency component and/or the high frequency component for the corresponding pixels.

The evaluation value may be processed with a median filter and the enhancement/suppression processing may be performed on the basis of comparison between the processed evaluation value and said threshold value. Further, the evaluation value of the intermediate frequency component and/or the high frequency component may be calculated on the basis of different colors of red, green and blue.

In granularity suppression in the enhancement/suppression processing of Japanese Unexamined Patent Publication No. 9(1997)-22460, continuity between adjacent pixels in a real image is not taken into account as described above. Accordingly, it is difficult to recognize the granularity suppression effect of the enhancement/suppression processing. To the contrast, the granularity suppression processing based on the morphology operation is processing on a real image space using isolation of granularity (continuity of noise between adjacent pixels is low). Accordingly, when an image signal is processed by this method, continuity between adjacent pixels is improved and the degree of suppression of granularity comes to be more easy to visually recognize.

It is preferred that the original image signal be so-called raw data, data as read out from a recording medium such as a print or a photographic film by a scanner or the like. However the original image signal may be an image signal which has been subjected to gradation processing, color correction, shading correction and/or the like. Further the original image signal need not be an image signal read out by a scanner or the like but may be an image signal such as directly taken out from a digital camera.

In accordance with another aspect of the present invention, there is provided an image processing system for carrying out the image processing method of the present invention. That is, the image processing system of the present invention is for processing an original image signal made up of a plurality of image signal components each representing a pixel of an original image and obtaining a final processed image signal, and comprises, a granularity suppressing means which carries out processing for suppressing granularity on the original image signal and obtains a granularity-suppressed image signal, a sharpness enhancing means which carries out processing for enhancing sharpness on the original image signal and obtains sharpness-enhanced image signal, an intermediate processed image signal generating means which generates at least one intermediate processed image signal by operation based on at least the granularity-suppressed image signal and the sharpness-enhanced image signal, and a final processed image signal generating means which obtains a final processed image signal by taking, as the image signal component for each pixel of the final processed image signal, the image signal component for the corresponding pixel of an image signal selected from the original image signal and the intermediate processed image signal(s) according to an indicator value calculated on the basis of the granularity-suppressed image signal, the sharpness-enhanced image signal and the original image signal.

As the granularity suppressing image processing to be carried out by the granularity suppressing means, there can be used, for instance, a median filter processing, hysteresis smoothing processing, noise removing processing by repetition, and granularity suppressing processing using morphology operation. As the sharpness enhancement image processing to be carried out by the sharpness enhancing means, there can be used, for instance, unsharp masking processing, high frequency band enhancement filter processing, and processing in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal (Japanese Unexamined Patent Publication No. 9(1997)-22460). However a combination of the granularity suppressing processing using morphology operation and the processing in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal (Japanese Unexamined Patent Publication No. 9(1997)-22460) is optimal.

When the granularity suppressing processing using morphology operation is employed as the granularity suppressing image processing to be carried out by the granularity suppressing means, it is preferred that the granularity suppressing processing be that defined by the aforesaid formula (27).

The operation for generating at least one intermediate processed image signal by the intermediate processed image signal generating means may be selected from a plurality of kinds of preset operations according to the relation with the original image signal, the kind of the image and/or the position of the pixel, or may be input from the external for each processing.

Specifically, when one intermediate processed image signal f3 is to be generated, the operation is preferably that defined by the aforesaid formula (2) which is based on the granularity-suppressed image signal f1 and the sharpness-enhanced image signal f2, or that defined by the following formula (3) which is based on the granularity-suppressed image signal f1, the sharpness-enhanced image signal f2 and the original image signal $f_{in}$.

It is preferred that the final processed image generating means obtains a final processed image signal by taking the image signal component of one of the intermediate processed image signal f3 and the original image signal $f_{in}$ as the image signal component for each pixel of the final processed image signal $f_{out}$ according to the aforesaid formula (1).

It is preferred that when two or more intermediate processed image signals f3, f4, . . . are to be obtained, the operation defined by the aforesaid formulae (5) and (6), or (16) to (18) be applied.

It is preferred that the weighting factors w1a, w1b, w2a and w2b in the formulae (5) and (6) and the weighting factors w4a, w4b, w5a and w5b in the formulae (16) to (18) be changed depending on the original image signal $f_{in}$. For example, in the case of an original image signal $f_{in}$ which is set so that the density is increased as the value of the image signal component increases, it is preferred that the weighting factors w1a, w1b, w2a and w2b and the weighting factors w4a, w4b, w5a and w5b be defined by the aforesaid formulae (7) to (10), (11) to (14), or (23) to (26).

Further it is preferred that the final processed image signal generating means obtains a final processed image signal $f_{out}$ by taking the image signal component of one of the two intermediate processed image signals f3 and f4 as the image signal component for each pixel of the final processed image signal $f_{out}$ according to the indicator value by the processing represented by the aforesaid formula (4), or obtains a final processed image signal $f_{out}$ by taking the image signal component of one of the three intermediate processed image signals f3, f4 and f5 as the image signal component for each pixel of the final processed image signal $f_{out}$ according to the indicator value by the processing represented by the aforesaid formula (15).

It is possible to record the steps of the image processing method of the present invention on a computer-readable recording medium as program for causing a computer to perform the steps.

That is, it is possible to provide a computer-readable recording medium on which the steps of carrying out processing for suppressing granularity and processing for enhancing sharpness separately on the original image signal to obtain a granularity-suppressed image signal and a sharpness-enhanced image signal, obtaining at least one intermediate processed image signal by operation based on at least the granularity-suppressed image signal and the sharpness-enhanced image signal, and taking the image signal component of one of the intermediate processed image signal(s) and the original image signal as the image signal component for each pixel of the final processed image signal according to the indicator value calculated on the basis of the granularity-suppressed image signal, the sharpness-enhanced image signal and the original image signal are recorded as program for causing a computer to perform the steps.

The intermediate processed image signal to be obtained may be one. In this case, the single intermediate processed image signal may be obtained by the operation processing defined by any one of the aforesaid formulae (1), (2) and (3) though the operation processing defined by the aforesaid formula (2) is preferred.

Two different intermediate processed image signals may be obtained. In this case, the two intermediate processed image signal may be obtained by the operation processing defined by the aforesaid formula (4), or by the operation processing defined by the aforesaid formulae (5) and (6). In the case where the operation processing defined by the aforesaid formulae (5) and (6) is employed, it is preferred that the weighting factors w1$a$, w1$b$, w2$a$ and w2$b$ in the formulae (5) and (6) be defined by the aforesaid formulae (7) to (10) or (11) to (14).

Three different intermediate processed image signals may be obtained. In this case, the three intermediate processed image signal may be obtained by the operation processing defined by the aforesaid formula (15), or by the operation processing defined by the aforesaid formulae (16) to (18). In the case where the operation processing defined by the aforesaid formulae (16) to (18) is employed, it is preferred that the weighting factors w4$a$, w4$b$, w5$a$ and w5$b$ in the formulae (17) and (18) be defined by the aforesaid formulae (19) to (22) or (23) to (26).

It is preferred that the steps of carrying out processing for suppressing granularity and processing for enhancing sharpness involve the granularity suppressing processing using morphology operation and the processing in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

It is further preferred that the granularity suppressing processing using morphology operation is processing defined by the aforesaid formula (27).

As can be understood from the description above, in accordance with the present invention, since the image signal component of one of the intermediate processed image signal(s) and the original image signal is taken as the image signal component for each pixel of the final processed image signal according to an indicator value calculated on the basis of the granularity-suppressed image signal, the sharpness-enhanced image signal and the original image signal, both the granularity suppression and the sharpness enhancement can be more effectively realized as compared with various conventional methods or the systems.

That is, since the intermediate processed image signal is obtained by processing the image signal components of the granularity-suppressed image signal and the sharpness-enhanced image signal as well as the original image signal, as required, in one-to-one correspondence, the intermediate processed image signal is effectively suppressed with the granularity without deteriorating the sharpness at edge portions or the like of the image. Further since the image signal component of one of the intermediate processed image signal(s) and the original image signal is taken as the image signal component for each pixel of the final processed image signal according to the indicator value which is calculated on the basis of the granularity-suppressed image signal, the sharpness-enhanced image signal and the original image signal and is indicative of the features of kinds of portions of the image, the granularity of the image further precisely suppressed without deteriorating the sharpness at edge portions or the like of the image.

Further when a combination of the granularity suppressing processing using morphology operation and the processing disclosed in Japanese Unexamined Patent Publication No. 9(1997)-22460 in which an image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal, the following result can be further expected.

That is, when the operation processing represented by the aforesaid formula (3) is employed on an image signal where the granularity suppression has not been carried out on sharpness enhanced portion, strong sharpness enhancing processing results in increase in the granularity to cancel the granularity suppressing processing which has been carried out on the original image signal to obtain the granularity-suppressed image signal. Accordingly, in the case where the operation processing represented by the aforesaid formula (3) is employed, it is preferred that the sharpness enhancing processing disclosed in Japanese Unexamined Patent Publication No. 8(1997)-22460 where the granularity can be suppressed to a certain extent be employed. Further when the sharpness at edge portions is deteriorated by the granularity suppressing processing, this result affects the result of the sharpness enhancing processing, and accordingly, the granularity suppressing processing using morphology operation which can suppress the granularity without deteriorating the sharpness at edge portions is preferred.

Thus it should be appreciated that by employing granularity suppressing processing, such as the granularity suppressing processing using morphology operation which can reserve the sharpness at edge portion, as the processing for suppressing the granularity, and employing the sharpness enhancing processing such as disclosed in Japanese Unexamined Patent Publication No. 8(1997)-22460 where the granularity can be suppressed to a certain extent as the processing for enhancing the sharpness, a more preferable intermediate processed image signal can be obtained.

BRIEF DESCRIPTION OF THE DRAWINGS

FIG. 16 is a graph showing the distributions of the low frequency, intermediate frequency and high frequency components.

DESCRIPTION OF THE PREFERRED EMBODIMENTS

Figure 1:
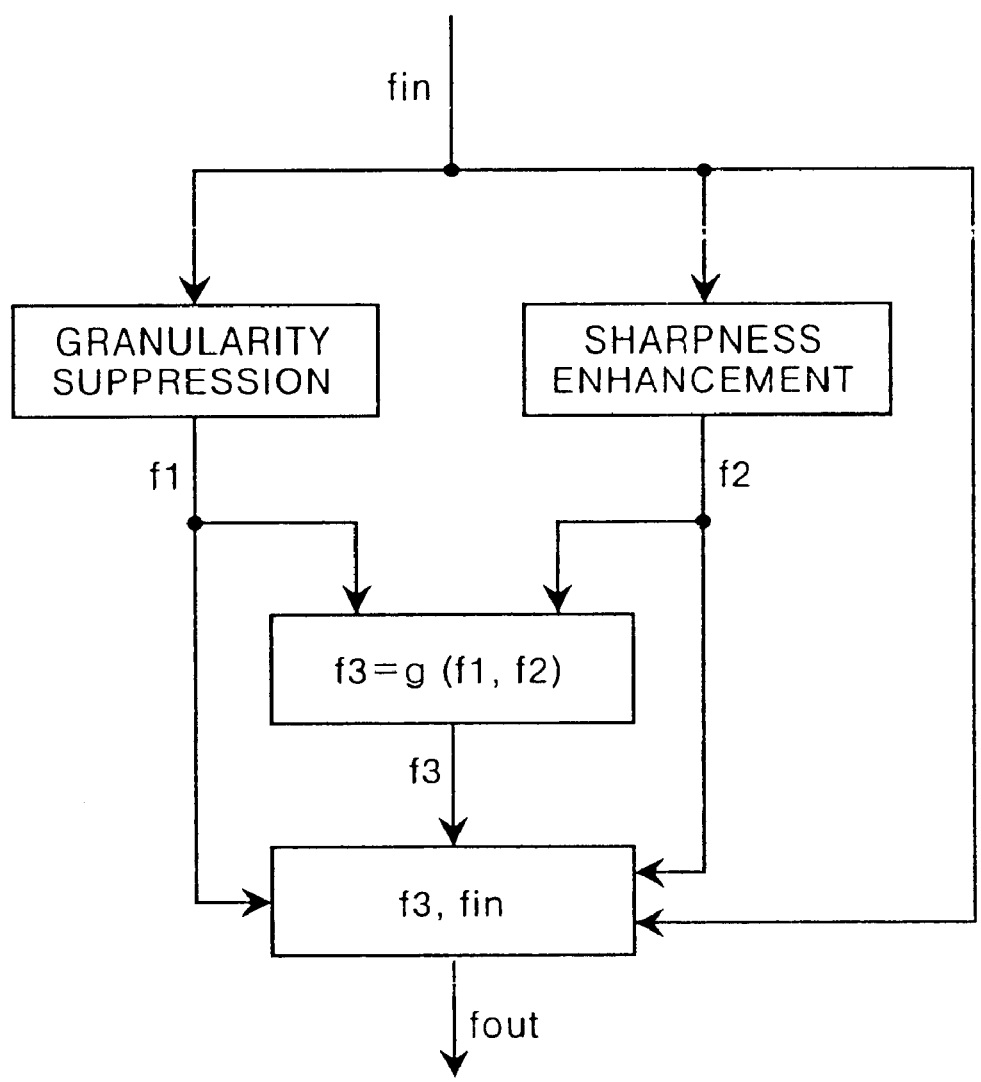
FIG. 1 is a flow chart for illustrating the flow of processing in an image processing method in accordance with a first embodiment of the present invention.
Figure 2:
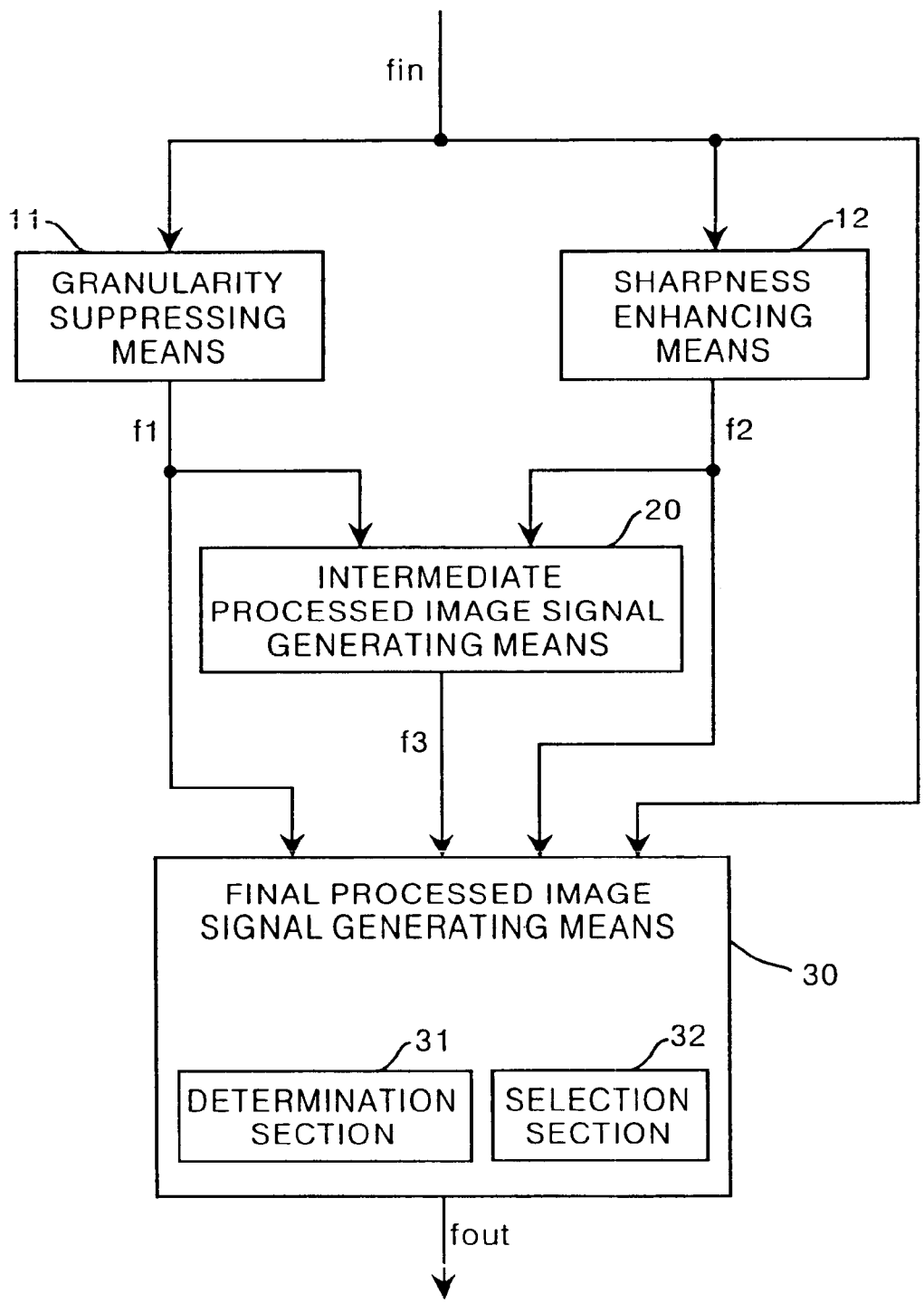
FIG. 2 is a schematic view showing an image processing system for carrying out the method shown in FIG. 1.

In FIG. 2, an image processing system for carrying out the image processing method in accordance with a first embodiment of the present invention shown in FIG. 1 comprises a granularity suppressing means 11 which receives an original image signal $f_{in}$ representing an original image and carries out processing for suppressing granularity on the original image signal $f_{in}$, thereby obtaining a granularity-suppressed image signal f1, a sharpness enhancing means 12 which receives the original image signal $f_{in}$ and carries out processing for enhancing sharpness on the original image signal $f_{in}$, thereby obtaining a sharpness-enhanced image signal f2, an intermediate processed image signal generating means 20 which generates an intermediate processed image signal f3 by carrying out operation g(f1, f2)=f3 based on the granularity-suppressed image signal f1 and the sharpness-enhanced image signal f2 on pixels one by one with the image signal components of the image signals f1 and f2 in one-to-one correspondence with each other, and a final processed image signal generating means 30 which obtains a final processed image signal $f_{out}$ by taking the image signal component of one of the intermediate processed image signal f3 and the original image signal $f_{in}$ as the image signal component for each pixel of the final processed image signal $f_{out}$ according to an indicator value k(f1, f2, $f_{in}$) calculated on the basis of the granularity-suppressed image signal f1, the sharpness-enhanced image signal f2 and the original image signal $f_{in}$.

For example, the operation to be performed by the intermediate processed image signal generating means 20 for obtaining the intermediate processed image signal f3 (=g(f1, f2)) may be weighted addition defined by the following formula (2).

$$f3 = w1 \cdot f1 + w2 \cdot f2 \quad (2)$$

wherein w1+w2=1 (0<w1<1, 0<w2<1), f1 represents the granularity-suppressed image signal, f2 represents the sharpness-enhanced image signal and f3 represents the intermediate processed image signal. That is, g(f1, f2)=w1·f1+w2·f2.

The values of the weighting factors w1 and w2 are set to different values by pixel by pixel according to, for instance, the values of the image signal components of the original image signal $f_{in}$. Specifically, for the image signal components for pixels in the flat density portion (an area of the image where change of the density of brightness is less) where the granularity is more apt to be remarked than the sharpness, the weighting factor w1 on the granularity-suppressed image signal f1 is set larger than the weighting factor w2 on the sharpness-enhanced image signal f2. To the contrast, for the image signal components for pixels in the edge portion (an area of the image where change of the density or brightness is sharp) where the sharpness is more apt to be remarked than the granularity, the weighting factor w2 on the sharpness-enhanced image signal f2 is set larger than the weighting factor w1 on the granularity-suppressed image signal f1.

In this particular embodiment, as the granularity suppression processing by the granularity suppressing means 11, median filter processing is employed, and as the sharpness enhancing processing, unsharp masking (USM) processing is employed.

The final processed image signal generating means 30 takes the image signal component of one of the intermediate processed image signal f3 and the original image signal $f_{in}$ as the image signal component of the final processed image signal $f_{out}$ according to, for instance, the image signal components of the granularity-suppressed image signal f1, the sharpness-enhanced image signal f2 and the original image signal $f_{in}$, e.g, whether the indicator value k(f1, f2, $f_{in}$)=(f1−$f_{in}$)·(f2−$f_{in}$) is positive or negative, and comprises a determination section 31 which determines whether the indicator value k(f1, f2, $f_{in}$)=(f1−$f_{in}$)·(f2−$f_{in}$) is positive or negative and a selection section 32 which selects the image signal component of one of the intermediate processed image signal f3 and the original image signal $f_{in}$ as the image signal component of the final processed image signal $f_{out}$ on the basis of determination by the determination section 31 as represented by the following formula (1).

$$f_{out} = \begin{cases} f_{in} & \text{(when } (f1 - f_{in}) \cdot (f2 - f_{in}) < 0), \\ f3 & \text{(when } (f1 - f_{in}) \cdot (f2 - f_{in}) \geq 0) \end{cases} \quad (1)$$

wherein $f_{in}$ represents the original image signal, f1 represents the granularity-suppressed image signal, f2 represents the sharpness-enhanced image signal, and f3 represents the intermediate processed image signal.

Operation of the image processing system of this embodiment will be described, hereinbelow.

First the original image signal $f_{in}$ is separately input into the granularity suppressing means 11 and the sharpness enhancing means 12. The original image signal $f_{in}$ has an edge portion where fluctuation in density is relatively large and a flat density portion where fluctuation in density is relatively small. High frequency noise is superimposed on these density distributions, and the high frequency noise is apt to be remarked especially in the flat density portion.

The granularity suppressing means 11 carries out median filer processing on the original image signal $f_{in}$ and calculates the granularity-suppressed image signal f1. The sharpness enhancing means 12 carries out USM processing on the original image signal $f_{in}$ and calculates the sharpness-enhanced image signal f2. The granularity-suppressed image signal f1 is an image signal where the granularity of the original image signal $f_{in}$ is suppressed and smoothed and the sharpness-enhanced image signal f2 is an image signal where the large density fluctuation portion of the original image signal $f_{in}$ is enhanced.

The granularity-suppressed image signal f1 and the sharpness-enhanced image signal f2 are input into the intermediate processed image signal generating means 20, and the intermediate processed image signal generating means 20 generates the intermediate processed image signal f3 by carrying out the weighted addition according to formula (2) on the basis of the granularity-suppressed image signal f1 and the sharpness-enhanced image signal f2. For the image signal components for pixels in the flat density portion where the granularity is more apt to be remarked than the sharpness, the weighting factor w1 on the granularity-suppressed image signal f1 is set larger than the weighting factor w2 on the sharpness-enhanced image signal f2, and for the image signal components for pixels in the edge portion where the sharpness is more apt to be remarked than the granularity, the weighting factor w2 on the sharpness-enhanced image signal f2 is set larger than the weighting factor w1 on the granularity-suppressed image signal f1. Accordingly, in the intermediate processed image signal f3, the granularity of the original image signal $f_{in}$ is suppressed in the flat density portion where the granularity is more apt to be remarked and the sharpness of the original image signal $f_{in}$ is enhanced in the edge portion where the sharpness is more apt to be remarked. That is, the intermediate processed image signal f3 is an image signal where the suppression of the granularity and the enhancement of the sharpness are consistent with each other.

The intermediate processed image signal f3 thus obtained is input into the final processed image signal generating means 30. The original image signal $f_{in}$, the granularity-suppressed image signal f1 and the sharpness-enhanced image signal f2 are also input into the final processed image signal generating means 30. The determination section 31 of the final processed image signal generating means 30 determines whether the indicator value $k(f1, f2, f_{in}) = (f1 - f_{in}) \cdot (f2 - f_{in})$ is positive or negative and inputs the result of the determination into the selection section 32.

The selection section 32 selects the image signal component of one of the intermediate processed image signal f3 and the original image signal $f_{in}$ as the image signal component of the final processed image signal $f_{out}$ on the basis of determination by the determination section 31 according to formula (1), that is, when the indicator value k is not smaller than 0, the selection section 32 outputs the image signal component of the intermediate processed image signal f3 as the image signal component of the final processed image signal $f_{out}$ and when the indicator value k is smaller than 0, the selection section 32 outputs the image signal component of the original image signal $f_{in}$ as the image signal component of the final processed image signal $f_{out}$.

At portions such as an edge portion of original image where the density abruptly changes, the indicator value k is generally not smaller than 0 ($k \geq 0$), and accordingly the intermediate processed image signal f3 where the sharpness is higher than the original image signal $f_{in}$ is selected. On the other hand, at the other portions (e.g., flat density portions), the indicator value k is generally smaller than 0 ($k < 0$), and accordingly, the original image signal $f_{in}$ is selected since sufficient granularity suppressing effect cannot be obtained with the intermediate processed image signal f3 which is a weighted average of the granularity-suppressed image signal f1 and the sharpness-enhanced image signal f2. In this case, by selecting the original image signal $f_{in}$, a granularity-suppressed final processed image signal $f_{out}$ can be obtained. The image represented by the final processed image signal $f_{out}$ thus obtained is an image signal where the granularity is further suppressed without deterioration in the sharpness of the edge portions and the like as compared with the intermediate processed image signal f3.

As can be understood from the description above, with the image processing system of this embodiment, both the granularity suppression and the sharpness enhancement can be more effectively realized as compared with various conventional methods or the systems.

Figure 3:
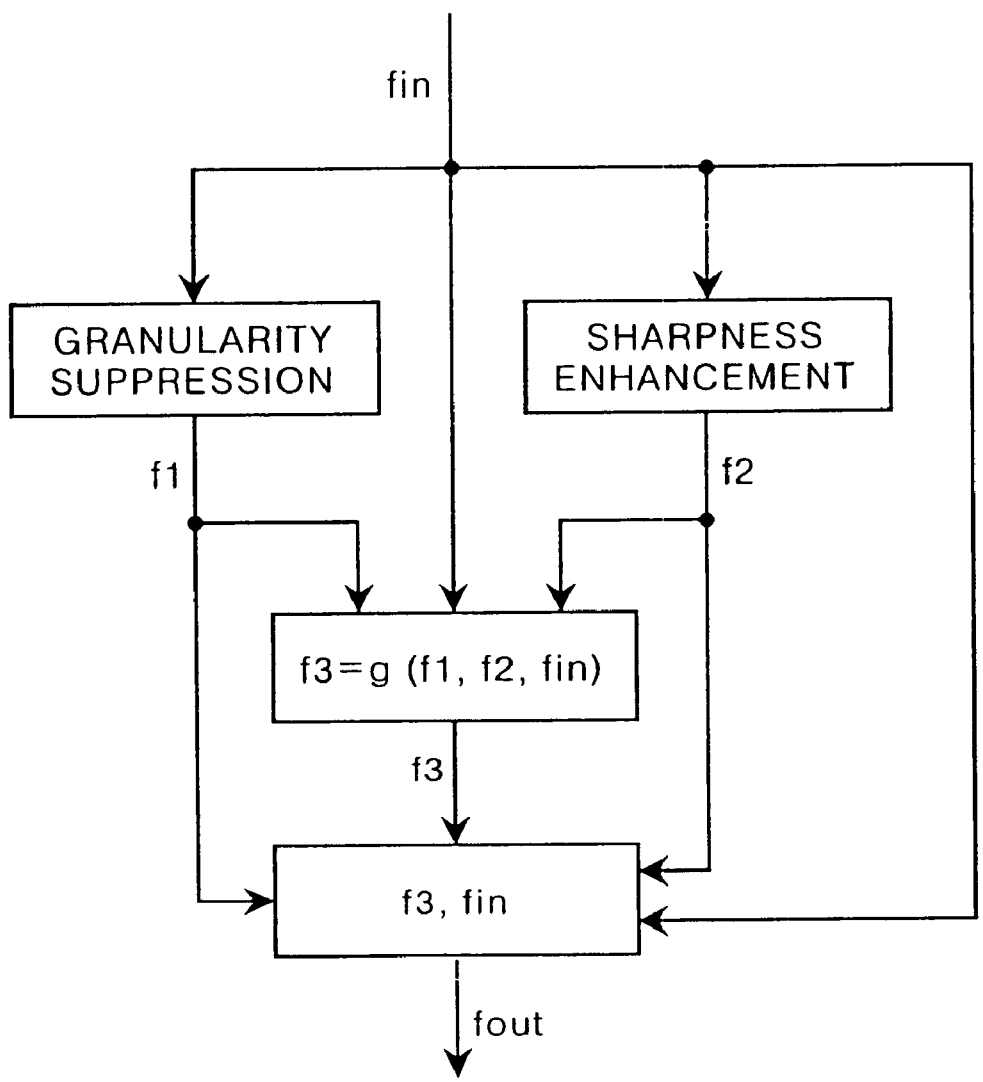
FIG. 3 is a flow chart for illustrating the flow of processing in an image processing method in accordance with a second embodiment of the present invention.
Figure 4:
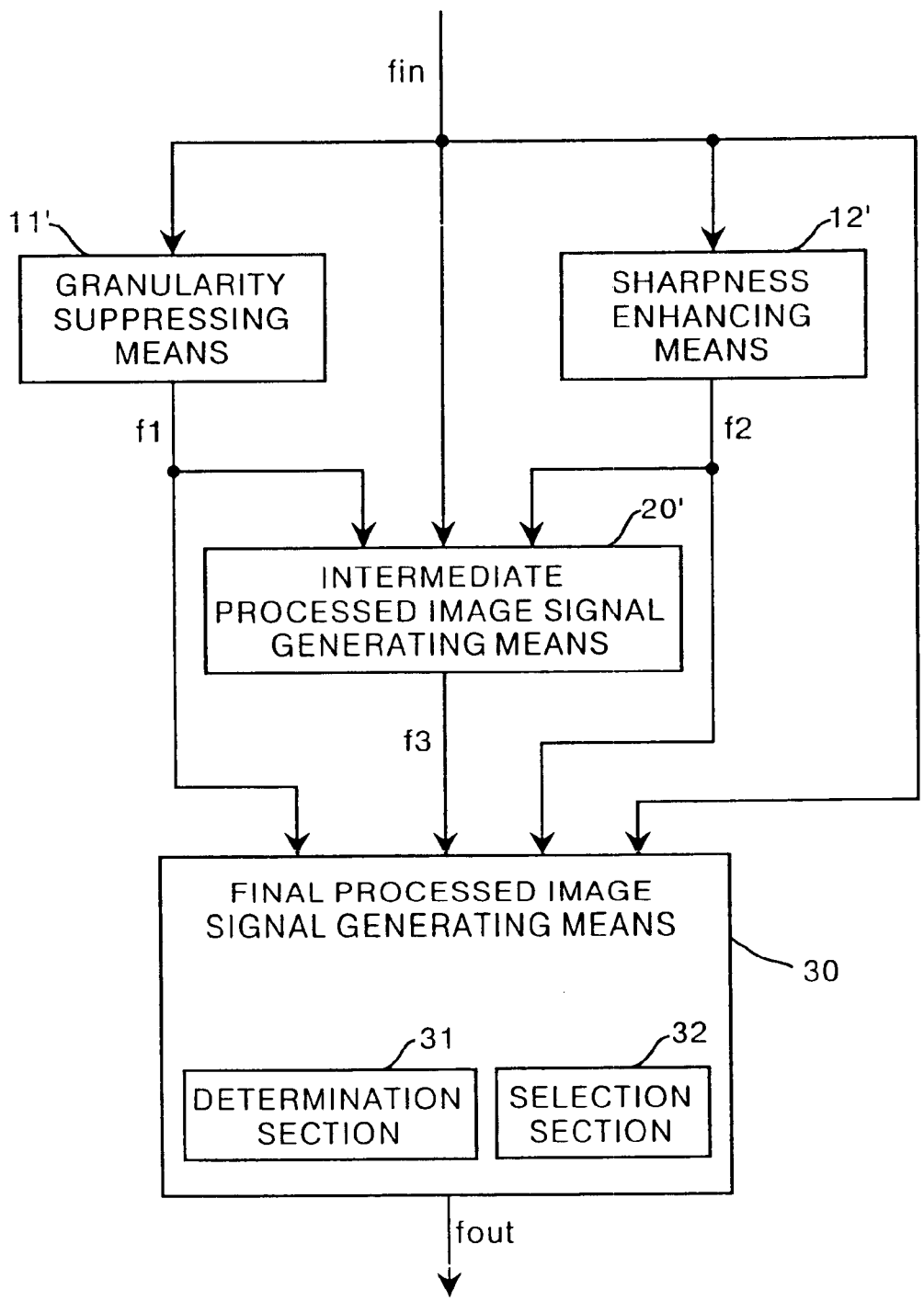
FIG. 4 is a schematic view showing an image processing system for carrying out the method shown in FIG. 3.

FIG. 3 is a flow chart for illustrating the flow of processing in an image processing method in accordance with a second embodiment of the present invention, and FIG. 4 is a schematic view showing an image processing system for carrying out the method shown in FIG. 3. The image processing system shown in FIG. 4 is basically the same as that shown in FIG. 2 except that the original image signal $f_{in}$ is one of a red original image signal $R_{in}$, a green original image signal $G_{in}$ and a blue original image signal $B_{in}$ which are red, green and blue components of a color image signal representing a color image such as taken by use of a digital still camera or photoelectrically read out from a color print or a color film, the intermediate processed image signal generating means 20' generates an intermediate processed image signal f3 by carrying out operation $g(f1, f2, f_{in}) = f3$ based on the granularity-suppressed image signal f1, the sharpness-enhanced image signal f2 and the original image signal $f_{in}$, the granularity suppressing means 11' carries out granularity suppression processing using morphology operation on the original image signal $f_{in}$, and the sharpness enhancing means 12' carries out sharpness enhancement processing in which the original image signal $f_{in}$ is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

For the purpose of simplicity, each of the red original image signal $R_{in}$, the green original image signal $G_{in}$ and the blue original image signal $B_{in}$ will be considered to be an original image signal $f_{in}$, each of granularity-suppressed image signals R1, G1 and B1 respectively obtained from the red original image signal $R_{in}$, the green original image signal $G_{in}$ and the blue original image signal $B_{in}$ will be considered to be a granularity-suppressed image signal f1, each of sharpness-enhanced image signals R2, G2 and B2 respectively obtained from the red original image signal $R_{in}$, the green original image signal $G_{in}$ and the blue original image signal $B_{in}$ will be considered to be a sharpness-enhanced image signal f2, each of intermediate processed image signals G3, R3 and B3 will be considered to be an intermediate processed image signal f3, and each of the final processed image signals $R_{out}$, $G_{out}$ and $B_{out}$ will be considered to be a final processed image signal $f_{out}$.

The operation to be performed by the intermediate processed image signal generating means 20' for obtaining the intermediate processed image signal f3 (=g(f1, f2, $f_{in}$)) may be weighted addition defined by the following formula (3).

$$f3=\{|f1-f_{in}|(f1-f_{in})+|f2-f_{in}|(f2-f_{in})\}/\{|f1-f_{in}|+|f2-f_{in}|\}+f_{in} \quad (3)$$

wherein $f_{in}$ represents the original image signal, f1 represents the granularity-suppressed image signal, f2 represents the sharpness-enhanced image signal and f3 represents the intermediate processed image signal.

In accordance with formula (3), the image signal components of the sharpness-enhanced image signal f2 are taken as the image signal components of the intermediate processed image signal f3 for pixels where the image signal components of the granularity-suppressed image signal f1 are equal to those of the original image signal $f_{in}$, the image signal components of the granularity-suppressed image signal f1 are taken as the image signal components of the intermediate processed image signal f3 for pixels where the image signal components of the sharpness-enhanced image signal f2 are equal to those of the original image signal $f_{in}$, and values obtained by weighting the differences between the image signal components of the granularity-suppressed image signal f1 and the original image signal $f_{in}$ and between the image signal components of the sharpness-enhanced image signal f2 and the original image signal $f_{in}$ and adding the weighted differences are taken as the image signal components of the intermediate processed image signal f3 for pixels where the image signal components of neither of the granularity-suppressed image signal f1 and the sharpness-enhanced image signal f2 are equal to those of the original image signal $f_{in}$. With this operation, for the image signal components for pixels in the flat density portion (an area of the image where change of the density or brightness is less) where the granularity is more apt to be remarked than the sharpness, the image signal components of the granularity-suppressed image signal f1 is more weighted and accordingly the granularity can be suppressed. To the contrary, for the image signal components for pixels in the edge portion (an area of the image where change of the density or brightness is sharp) where the sharpness is more apt to be remarked than the granularity, the image signal components of the sharpness-enhanced image signal f2 is more weighted and accordingly the sharpness can be enhanced.

Figure 5:
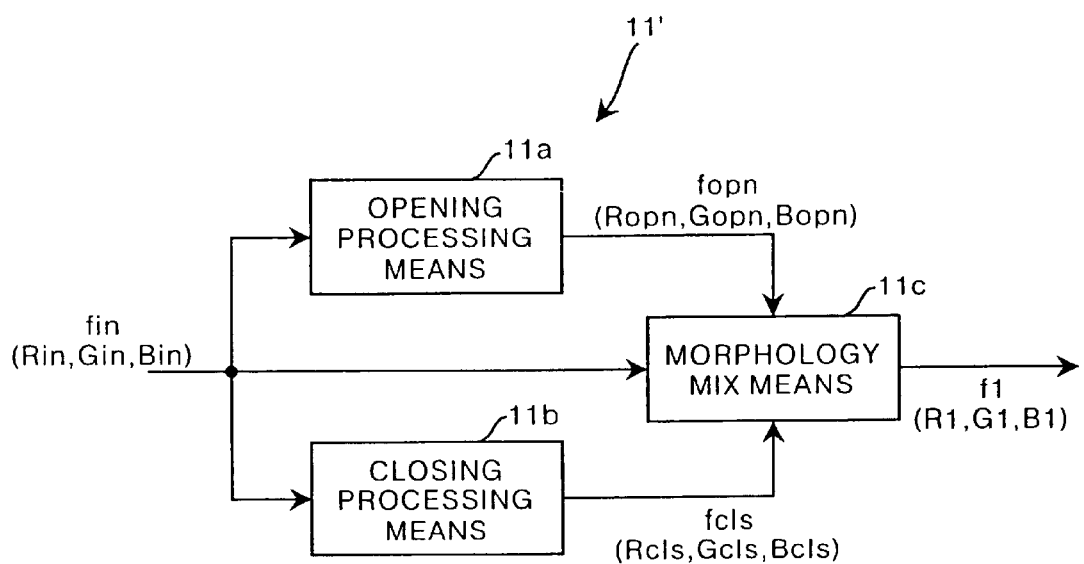
FIG. 5 is a view showing in detail the arrangement of the granularity suppressing means.

As shown in FIG. 5, the granularity suppressing means 11' comprises an opening processing means 11a which carries out opening processing on the input original image signal $f_{in}$ ($R_{in}$, $G_{in}$, $B_{in}$) and obtains an opening image signal $f_{opn}$ ($R_{opn}$, $G_{opn}$, $B_{opn}$), a closing processing means 11b which carries out closing processing on the input original image signal $f_{in}$ ($R_{in}$, $G_{in}$, $B_{in}$) and obtains a closing image signal $f_{cls}$ ($R_{cls}$, $G_{cls}$, $B_{cls}$), and a morphology MIX means 11c which obtains a granularity-suppressed image signal f1 (R1, G1, B1) according to the following formula (27) on the basis of the opening image signal $f_{opn}$, the closing image signal $f_{cls}$ and the original image signal $f_{in}$.

$$f1 = \begin{cases} f1 = f_{opn} \text{ (when } f_{cls} = f_{in}) \\ f_{cls} \text{ (when } f_{opn} = f_{in}) \\ f1 = (f_{opn} + f_{cls})/2 \text{ (when } f_{cls} \neq f_{in}, f_{opn} \neq f_{in}) \end{cases} \quad (27)$$

wherein
f1: granularity-suppressed image signal,
$f_{cls}$: closing image signal,
$f_{opn}$: opening image signal,
$f_{in}$: original image signal.

Figure 6:
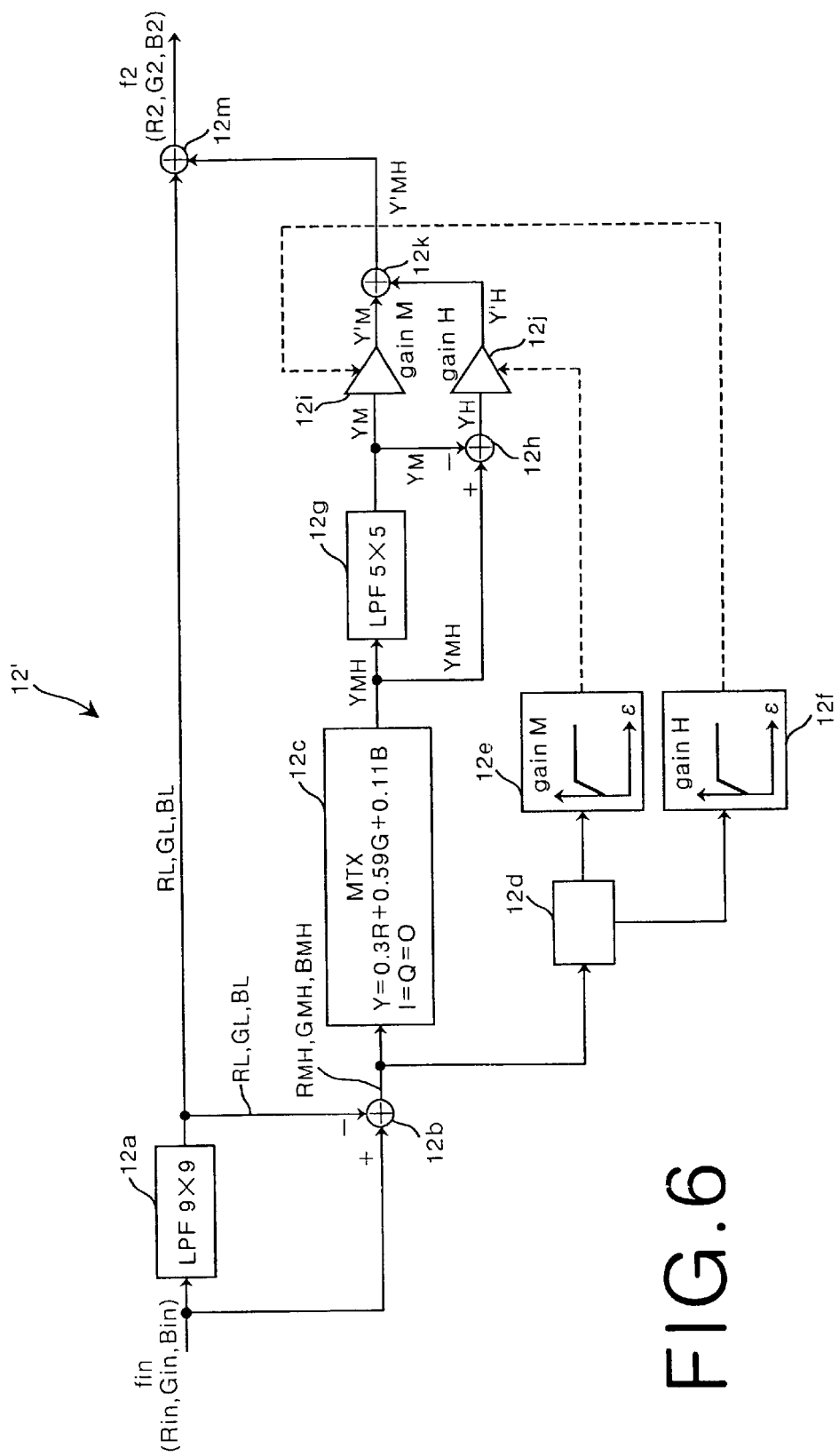
FIG. 6 is a view showing in detail the arrangement of the sharpness enhancing means.

The sharpness enhancing means 12' comprises, as shown in FIG. 6, a 9 pixels×9 pixels low-pass filter (LPF) 12a which carries out filtering processing on the input original image signal $f_{in}$ ($R_{in}$, $G_{in}$, $B_{in}$) and extracts low frequency component ($R_L$, $G_L$, $B_L$) of the original image signal $f_{in}$, an operator 12b which subtracts the low frequency component ($R_L$, $G_L$, $B_L$) from the original image signal ($R_{in}$, $G_{in}$, $B_{in}$) and extracts intermediate to high frequency component ($R_{MH}$, $G_{MH}$, $B_{MH}$), a brightness signal extracting means (MTX) 12c which extracts a brightness component $Y_{MH}$ from the intermediate to high frequency component ($R_{MH}$, $G_{MH}$, $B_{MH}$), a 5 pixels×5 pixels low-pass filter 12g which carries out filtering processing on the brightness component $Y_{MH}$ and extracts an intermediate frequency component $Y_M$ of the brightness component $Y_{MH}$, an operator 12h which subtracts the intermediate frequency component $Y_M$ from the brightness component $Y_{MH}$ and extracts a high frequency component $Y_H$ of the brightness component $Y_{MH}$, a variable gain amplifier 12i into which the intermediate frequency component $Y_M$ is input, a variable gain amplifier 12j into which the high frequency component $Y_H$ is input, a correlation value calculating means 12d which calculates the correlation value ε among red, green and blue of the intermediate to high frequency component ($R_{MH}$, $G_{MH}$, $B_{MH}$), a lookup table (LUT) 12e in which the correlation value ε is related to the gain M to the intermediate frequency component $Y_M$, a lookup table (LUT) 12f in which the correlation value ε is related to the gain H to the high frequency component $Y_H$, an operator 12k which combines the intermediate frequency component $Y'_M$ output from the variable gain amplifier 12i with the high frequency component $Y'_H$ output from the variable gain amplifier 12j into a combined intermediate to high frequency component $Y'_{MH}$, and an operator 12m which combines the combined intermediate to high frequency component $Y'_{MH}$ with the low frequency component ($R_L$, $R_G$, $R_B$) into a sharpness-enhanced image signal f2 ($R_2$, $G_2$, $B_2$).

The LUT 12e and the LUT 12f are set so that the gain M for a given correlation value ε is smaller than the gain H for the given correlation value ε up to a predetermined value of the correlation value ε.

The granularity-suppressed image signal f1, the sharpness-enhanced image signal f2 and the original image signal $f_{in}$ are input into the intermediate processed image signal generating means 20', and the intermediate processed image signal generating means 20' generates the intermediate processed image signal f3 (R3, G3, B3) by carrying out the operation according to formula (3).

The intermediate processed image signal f3 thus obtained is input into the final processed image signal generating means 30 together with the original image signal $f_{in}$, the granularity-suppressed image signal f1 and the sharpness-enhanced image signal f2. The determination section 31 of the final processed image signal generating means 30 determines whether the indicator value k(f1, f2, $f_{in}$)=(f1−$f_{in}$)·(f2−$f_{in}$) is positive or negative and inputs the result of the determination into the selection section 32.

The selection section 32 selects the image signal component of one of the intermediate processed image signal f3 and the original image signal $f_{in}$ as the image signal component of the final processed image signal $f_{out}$ on the basis of determination by the determination section 31 according to formula (1), that is, when the indicator value k is not smaller than 0, the selection section 32 outputs the image signal component of the intermediate processed image signal f3 as the image signal component of the final processed image signal $f_{out}$ and when the indicator value k is smaller than 0, the selection section 32 outputs the image signal component of the original image signal $f_{in}$ as the image signal component of the final processed image signal $f_{out}$.

As can be understood from the description above, with the image processing system of this embodiment, both the granularity suppression and the sharpness enhancement can be more effectively realized as compared with various conventional methods or the systems.

Though, in the embodiments described above, the intermediate processed image signal generating means 20 generates a single intermediate processed image signal f3 and the final processed image signal generating means 30 selects as the final processed image signal $f_{out}$ one of the intermediate processed image signal f3 and the original image signal $f_{in}$ according to the indicator value k, the method and system of the present invention need not be limited to such a form. For example, the intermediate processed image signal generating means 20 may generate two or more different intermediate processed image signals f3, f4, . . . and the final processed image signal generating means 30 may select as the final processed image signal $f_{out}$ one of the intermediate processed image signals f3, f4, . . . or one of the intermediate processed image signals f3, f4, . . . and the original image signal $f_{in}$.

Figure 7:
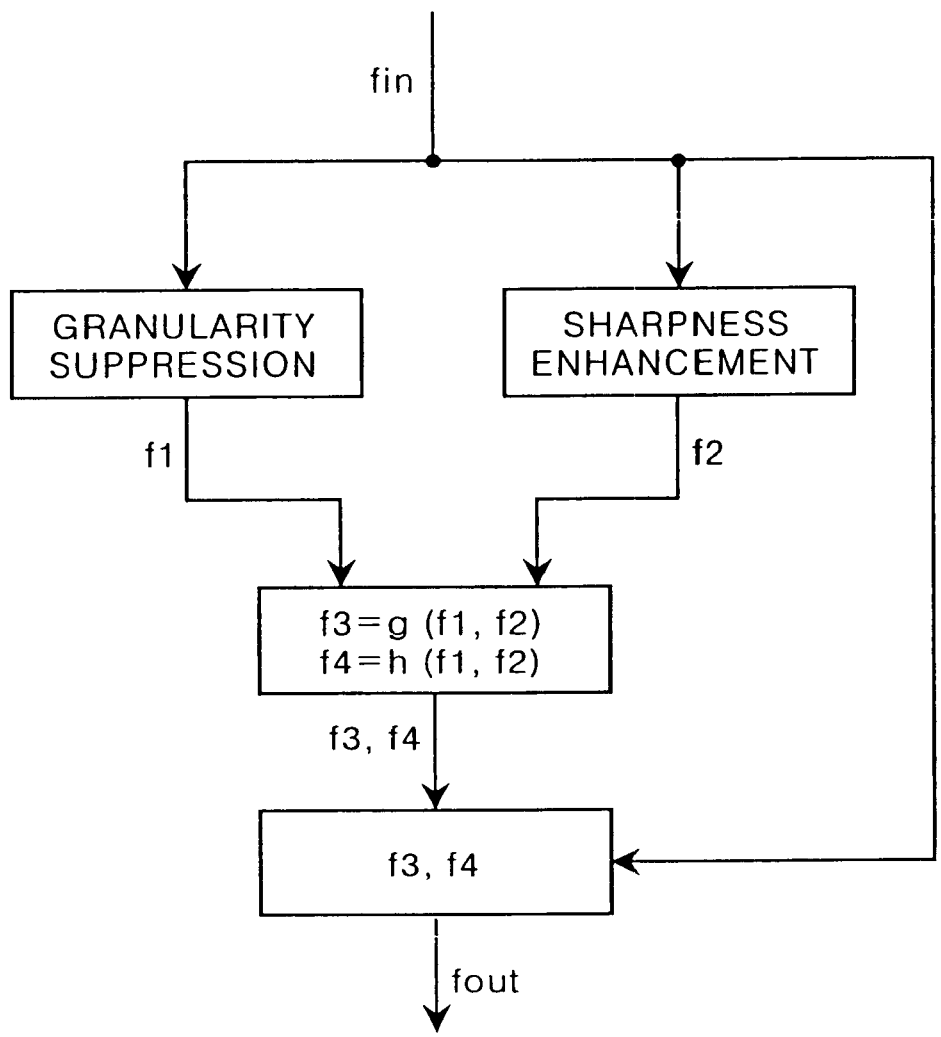
FIG. 7 is a flow chart for illustrating the flow of processing in an image processing method in accordance with a third embodiment of the present invention.
Figure 8:
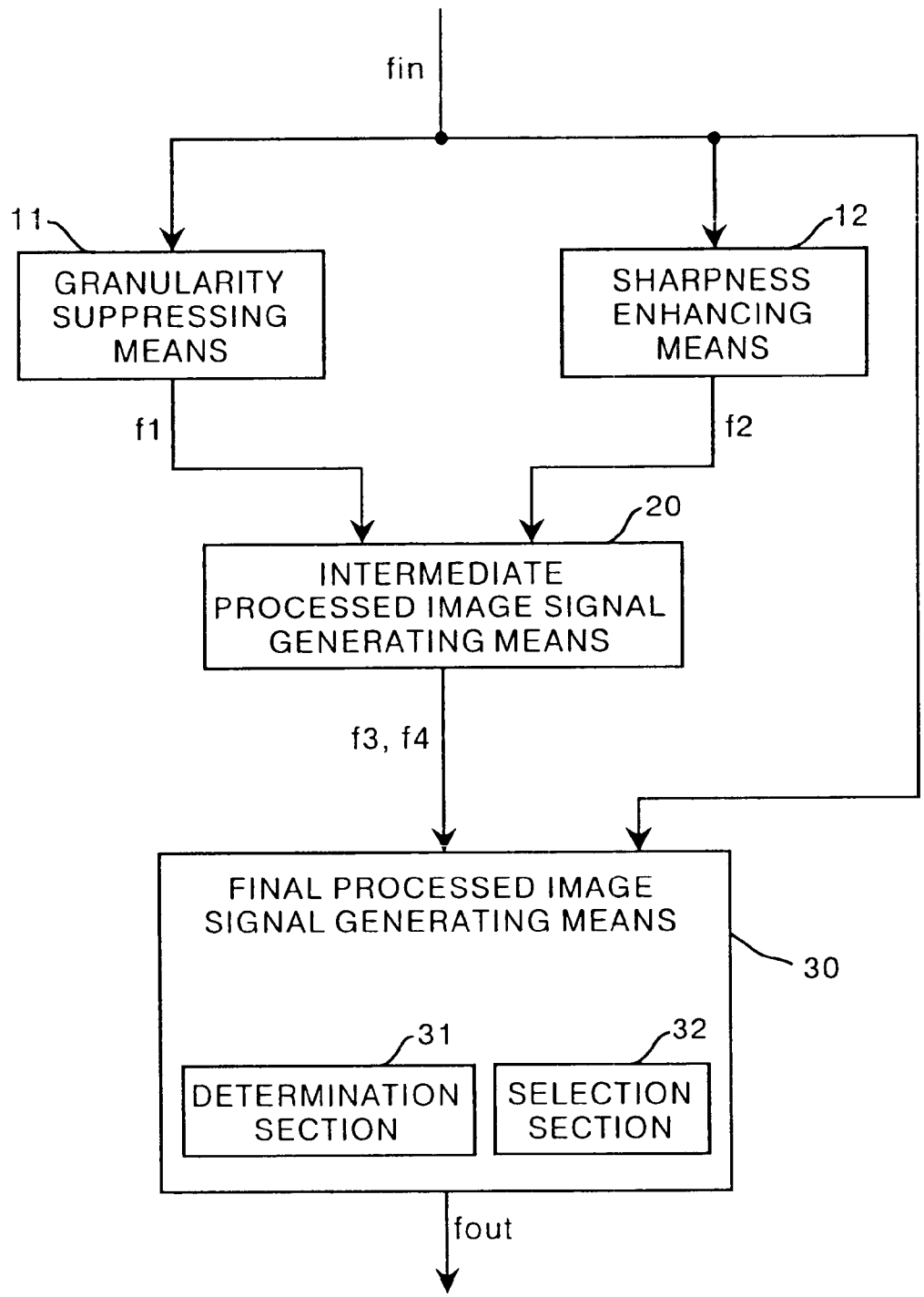
FIG. 8 is a schematic view showing an image processing system for carrying out the method shown in FIG. 7.
Figure 9:
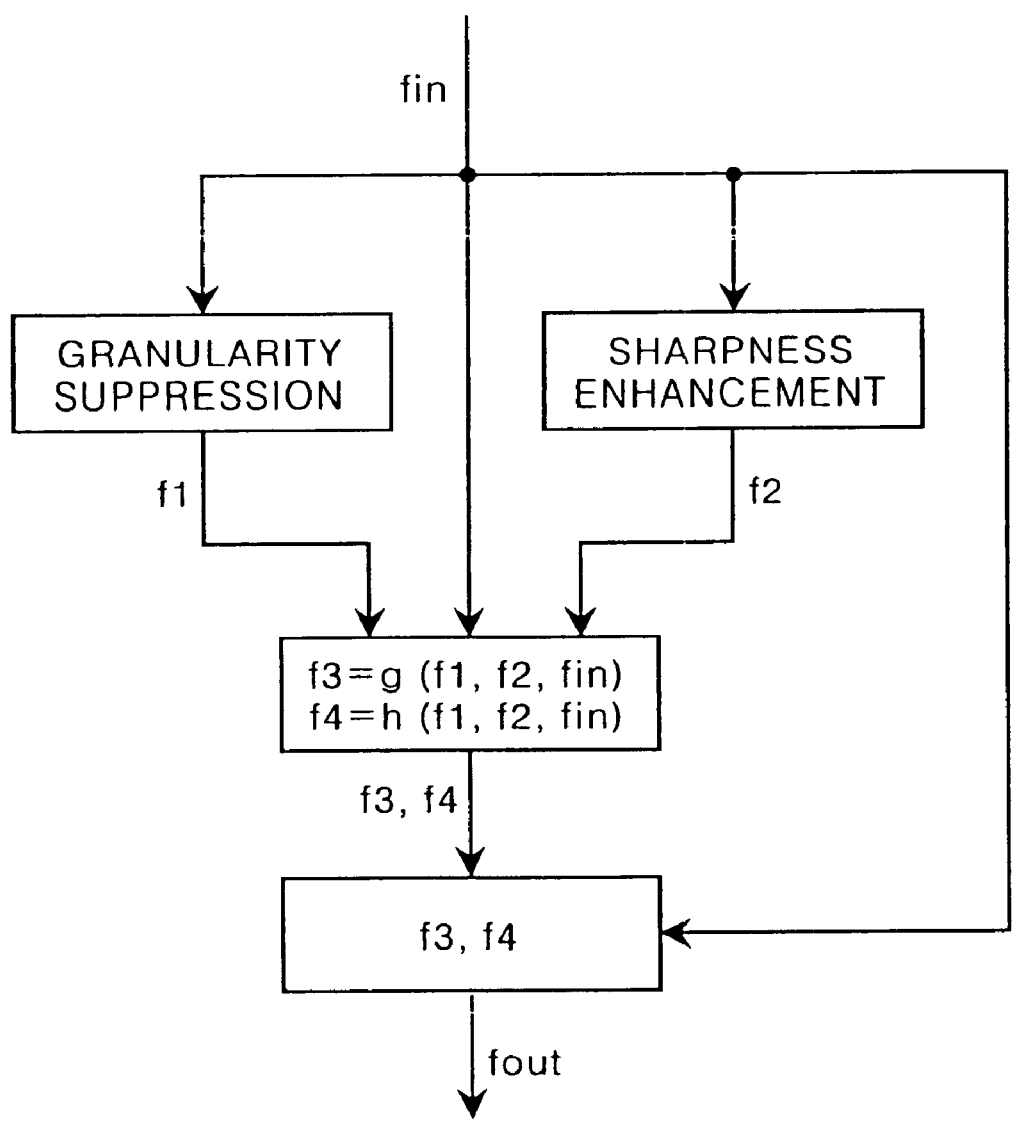
FIG. 9 is a flow chart for illustrating the flow of processing in an image processing method in accordance with a fourth embodiment of the present invention.
Figure 10:
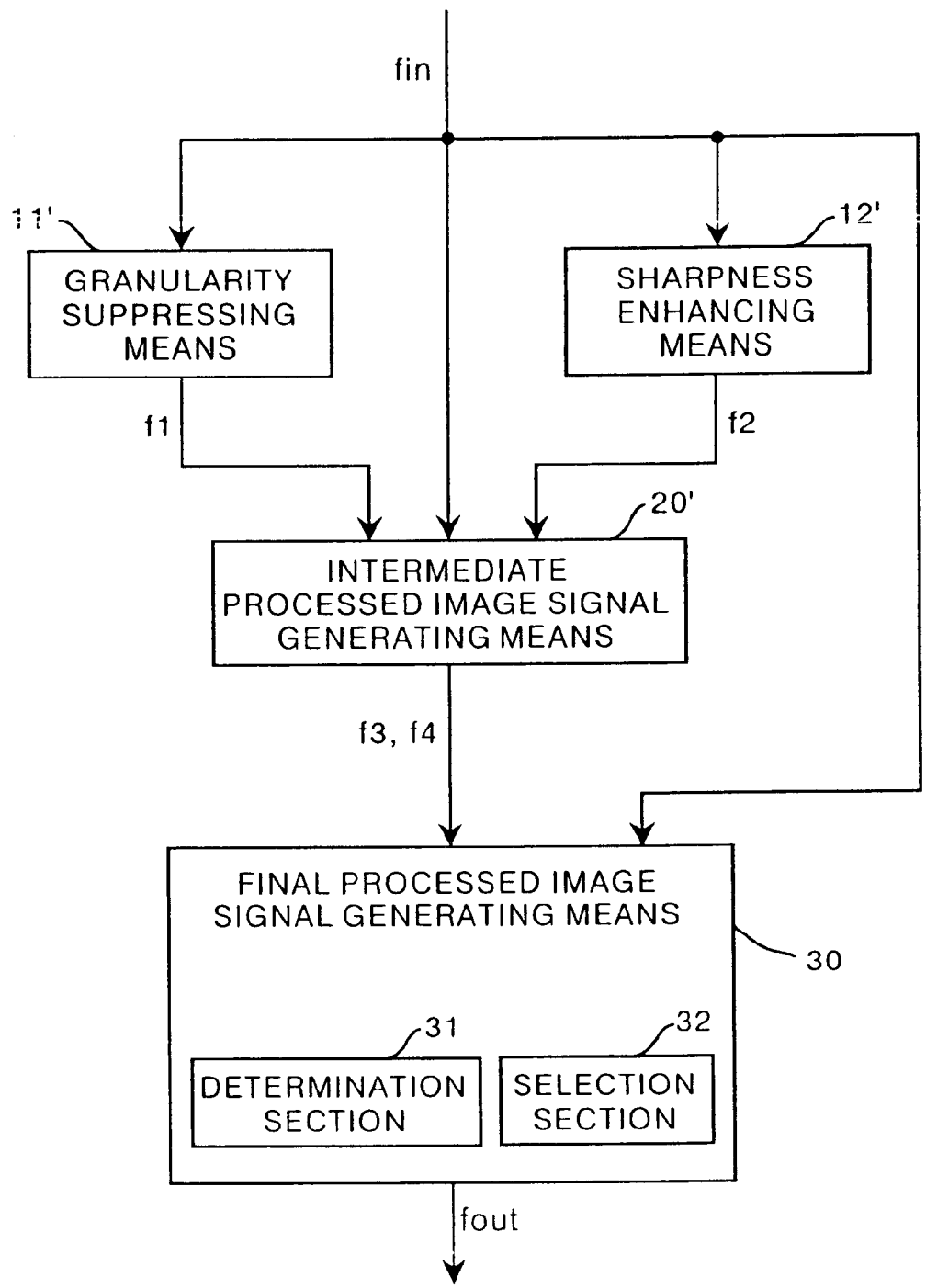
FIG. 10 is a schematic view showing an image processing system for carrying out the method shown in FIG. 9.

FIG. 7 is a flow chart for illustrating the flow of processing in an image processing method in accordance with a third embodiment of the present invention, and FIG. 8 is a schematic view showing an image processing system for carrying out the method shown in FIG. 7.

In FIG. 8, the image processing system for carrying out the image processing method in accordance with the third embodiment of the present invention shown in FIG. 7 comprises a granularity suppressing means 11 which receives an original image signal $f_{in}$ representing an original image and carries out processing for suppressing granularity on the original image signal $f_{in}$, thereby obtaining a granularity-suppressed image signal f1, a sharpness enhancing means 12 which receives the original image signal $f_{in}$ and carries out processing for enhancing sharpness on the original image signal $f_{in}$, thereby obtaining a sharpness-enhanced image signal f2, an intermediate processed image signal generating means 20 which generates two different intermediate processed image signals f3 and f4 by carrying out operation g(f1, f2)=f3, h(f1, f2)=f4 based on the granularity-suppressed image signal f1 and the sharpness-enhanced image signal f2 on pixels one by one with the image signal components of the image signals f1 and f2 in one-to-one correspondence with each other, and a final processed image signal generating means 30 which obtains a final processed image signal $f_{out}$ by taking the image signal component of one of the first and second intermediate processed image signals f3 and f4 as the image signal component for each pixel of the final processed image signal $f_{out}$ according to an indicator value k(f1, f2, $f_{in}$) calculated on the basis of the granularity-suppressed image signal f1, the sharpness-enhanced image signal f2 and the original image signal $f_{in}$.

The operations to be performed by the intermediate processed image signal generating means 20 for obtaining the intermediate processed image signals f3 (=g(f1, f2)) and f4(=h(f1, f2)) are weighted additions defined by the following formulae (5) and (6).

$$f3 = w1a \cdot f1 + w1b \cdot f2 \tag{5}$$

$$f4 = w2a \cdot f1 + w2b \cdot f2 \tag{6}$$

wherein w1a+w1b=1 (0≦w1a≦1, 0≦w1b≦1), w2a+w2b=1 (0≦w2a≦1, 0≦w2b≦1), f1 represents the granularity-suppressed image signal, f2 represents the sharpness-enhanced image signal, f3 represents the first intermediate processed image signal, and f4 represents the second intermediate processed image signal.

That is, g(f1, f2)=w1a·f1+w1b·f2, h(f1, f2)=w2a·f1+w2b·f2.

The values of the weighting factors w1a, w1b, w2a and w2b are set to different values by pixel by pixel according to, for instance, the values of the image signal components of the original image signal $f_{in}$. Specifically, the weighting factors w1a, w1b, w2a and w2b are set according to the following formulae (7) to (10), or the following formulae (11) to (14). According to the formulae (7) to (10), or the formulae (11) to (14), the weighting factors w1a and w2b are increased as the image signal component of the original image signal $f_{in}$ becomes smaller and the weight on the granularity-suppressed image signal f1 becomes larger than that on the sharpness-enhanced image signal f2 in the first intermediate processed image signal f3 and the weight on the sharpness-enhanced image signal f2 becomes larger than that on the granularity-suppressed image signal f1 in the second intermediate processed image signal f4 as the image signal component of the original image signal $f_{in}$ becomes smaller, whereby the first intermediate processed image signal f3 becomes higher in the degree of suppression of the granularity than the second intermediate processed image signal f4.

To the contrast, according to the formulae (7) to (10), or the formulae (11) to (14), the weighting factors w1b and w2a are increased as the image signal component of the original image signal $f_{in}$ becomes larger and the weight on the sharpness-enhanced image signal f2 becomes larger than that on the granularity-suppressed image signal f1 in the first intermediate processed image signal f3 and the weight on the granularity-suppressed image signal f1 becomes larger than that on the sharpness-enhanced image signal f2 in the second intermediate processed image signal f4 as the image signal component of the original image signal $f_{in}$ becomes larger, whereby the second intermediate processed image signal f4 becomes higher in the degree of suppression of the granularity than the first intermediate processed image signal f3.

The weighting factors w1a, w1b, w2a and w2b set according to formulae (11) to (14) are preferably applied to a region where the granularity is very bad.

$$w1a = 1 - (c\alpha + t)/C \tag{7}$$

$$w1b = (c\alpha + t)/C \tag{8}$$

$$w2a = (c\alpha + t)/C \tag{9}$$

$$w2b = 1 - (c\alpha + t)/C \tag{10}$$

wherein $t = (|f2 - f_{in}|)/\{(|f1 - f_{in}|)(|f2 - f_{in}|)\}$, $\alpha = f_{in}/f0$, $f_{in}$=an original image signal, f0=a reference value, c=a constant, and C=a constant.

$$w1a = \{c(1-\alpha) + t\}/C \tag{11}$$

$$w1b = 1 - \{c(1-\alpha) + t\}/C \tag{12}$$

$$w2a = 1 - (c\alpha + t)/C \tag{13}$$

$$w2b = (c\alpha + t)/C \tag{14}$$

wherein t=(|f2−f$_{in}$|)/{(|f1−f$_{in}$|)(|f2−f$_{in}$|)},

α=f$_{in}$/f0, f$_{in}$=an original image signal, f0=a reference value, c=a constant, and C=a constant.

In this particular embodiment, as the granularity suppression processing by the granularity suppressing means 11, median filter processing is employed, and as the sharpness enhancing processing, unsharp masking (USM) processing is employed.

The final processed image signal generating means 30 takes the image signal component of one of the first and second intermediate processed image signals f3 and f4 as the image signal component of the final processed image signal f$_{out}$ according to, for instance, the image signal components of the granularity-suppressed image signal f1, the sharpness-enhanced image signal f2 and the original image signal f$_{in}$, e.g., whether the indicator value k(f1, f2, f$_{in}$)=(f1−f$_{in}$)·(f2−f$_{in}$) is positive or negative, and comprises a determination section 31 which determines whether the indicator value k(f1, f2, f$_{in}$)=(f1−f$_{in}$)·(f2−f$_{in}$) is positive or negative and a selection section 32 which selects the image signal component of one of the first and second intermediate processed image signal f3 and f4 as the image signal component of the final processed image signal f$_{out}$ on the basis of determination by the determination section 31 as represented by the following formula (4).

$$f_{out} = \begin{cases} f3 \text{ (when } (f1-f_{in})\cdot(f2-f_{in}) < 0), \\ f4 \text{ (when } (f1-f_{in})\cdot(f2-f_{in}) \geq 0) \end{cases} \quad (4)$$

wherein f$_{in}$ represents the original image signal, f1 represents the granularity-suppressed image signal, f2 represents the sharpness-enhanced image signal, f3 represents the first intermediate processed image signal, and f4 represents the second intermediate processed image signal.

Operation of the image processing system of this embodiment will be described, hereinbelow.

First the original image signal f$_{in}$ is separately input into the granularity suppressing means 11 and the sharpness enhancing means 12. The original image signal f$_{in}$ has an edge portion where fluctuation in density is relatively large and a flat density portion where fluctuation in density is relatively small. High frequency noise is superimposed on these density distributions, and the high frequency noise is apt to be remarked especially in the flat density portion.

The granularity suppressing means 11 carries out median filer processing on the original image signal f$_{in}$ and calculates the granularity-suppressed image signal f1. The sharpness enhancing means 12 carries out USM processing on the original image signal f$_{in}$ and calculates the sharpness-enhanced image signal f2. The granularity-suppressed image signal f1 is an image signal where the granularity of the original image signal f$_{in}$ is suppressed and smoothed and the sharpness-enhanced image signal f2 is an image signal where the large density fluctuation portion of the original image signal f$_{in}$ is enhanced.

The granularity-suppressed image signal f1 and the sharpness-enhanced image signal f2 are input into the intermediate processed image signal generating means 20, and the intermediate processed image signal generating means 20 generates the intermediate processed image signals f3 and f4 by carrying out the weighted addition according to formulae (5) and (6) and the formulae (7) to (10) or the formulae (11) to (14) on the basis of the granularity-suppressed image signal f1 and the sharpness-enhanced image signal f2.

When the weighting factors are calculated according to formulae (7) to (10), the weight on the granularity-suppressed image signal f1 becomes larger than that on the sharpness-enhanced image signal f2 in the first intermediate processed image signal f3 and the weight on the sharpness-enhanced image signal f2 becomes larger than that on the granularity-suppressed image signal f1 in the second intermediate processed image signal f4 as the image signal component of the original image signal f$_{in}$ becomes smaller.

To the contrast, according to the formulae (7) to (10), the weight on the sharpness-enhanced image signal f2 becomes larger than that on the granularity-suppressed image signal f1 in the first intermediate processed image signal f3 and the weight on the granularity-suppressed image signal f1 becomes larger than that on the sharpness-enhanced image signal f2 in the second intermediate processed image signal f4 as the image signal component of the original image signal f$_{in}$ becomes larger.

When the weighting factors are calculated according to formulae (11) to (14), the weight on the granularity-suppressed image signal f1 is larger than that on the sharpness-enhanced image signal f2 in either of the first and second intermediate processed image signals f3 and f4 in a region where the image signal components of the original image signal f$_{in}$ are relatively small and the first intermediate processed image signal f3 is higher in the degree of suppression of the granularity than the second intermediate processed image signal f4. Accordingly, the weighting factors calculated according to formulae (11) to (14) are preferably applied to a region where the granularity is very bad.

The intermediate processed image signals f3 and f4 thus obtained are input into the final processed image signal generating means 30. The original image signal f$_{in}$, the granularity-suppressed image signal f1 and the sharpness-enhanced image signal f2 are also input into the final processed image signal generating means 30. The determination section 31 of the final processed image signal generating means 30 determines whether the indicator value k(f1, f2, f$_{in}$)=(f1−f$_{in}$)·(f2−f$_{in}$) is positive or negative and inputs the result of the determination into the selection section 32.

The selection section 32 selects the image signal component of one of the intermediate processed image signal f3 and the second intermediate processed image signal f4 as the image signal component of the final processed image signal f$_{out}$ on the basis of determination by the determination section 31 according to formula (4), that is, when the indicator value k is not smaller than 0, the selection section 32 outputs the image signal component of the second intermediate processed image signal f4 as the image signal component of the final processed image signal f$_{out}$ and when the indicator value k is smaller than 0, the selection section 32 outputs the image signal component of the first intermediate processed image signal f3 as the image signal component of the final processed image signal f$_{out}$.

At portions such as an edge portion of original image where the density abruptly changes, the indicator value k is generally not smaller than 0 (k≧0), and accordingly the second intermediate processed image signal f4 is selected. Since the second intermediate processed image signal f4 is obtained by weighting the sharpness-enhanced image signal f2 more than the granularity-suppressed image signal f1 on the side of the edge portion where the density is lower than the other side according to formulae (9) and (10) or (13) and (14), the second intermediate processed image signal f4 may be considered to be a sharpness-enhanced image signal where the edge portion of the image is enhanced.

On the other hand, at the other portions (e.g., flat density portions), the indicator value k is generally smaller than 0 (k<0), and accordingly, the first intermediate processed image signal f3 is selected. As can be seen from formulae (7) and (8) or (11) and (12), though being an image signal which is relatively low in the degree of granularity suppression in a low density region where the granularity is less apt to be remarked, the first intermediate processed image signal f3 may be considered to be an image signal in which the weight on the granularity-suppressed image signal f1 is larger than that on the sharpness-enhanced image signal f2 in a high density region where the granularity is more apt to be remarked and the granularity of the image is effectively suppressed.

As can be understood from the description above, with the image processing system of this embodiment, both the granularity suppression and the sharpness enhancement can be more effectively realized according to the features of portions of the image (whether an edge portion or a flat density portion) as compared with various conventional methods or the systems, and at the same time the degree of granularity suppression can be properly controlled according to the density of the image.

Figure 12:
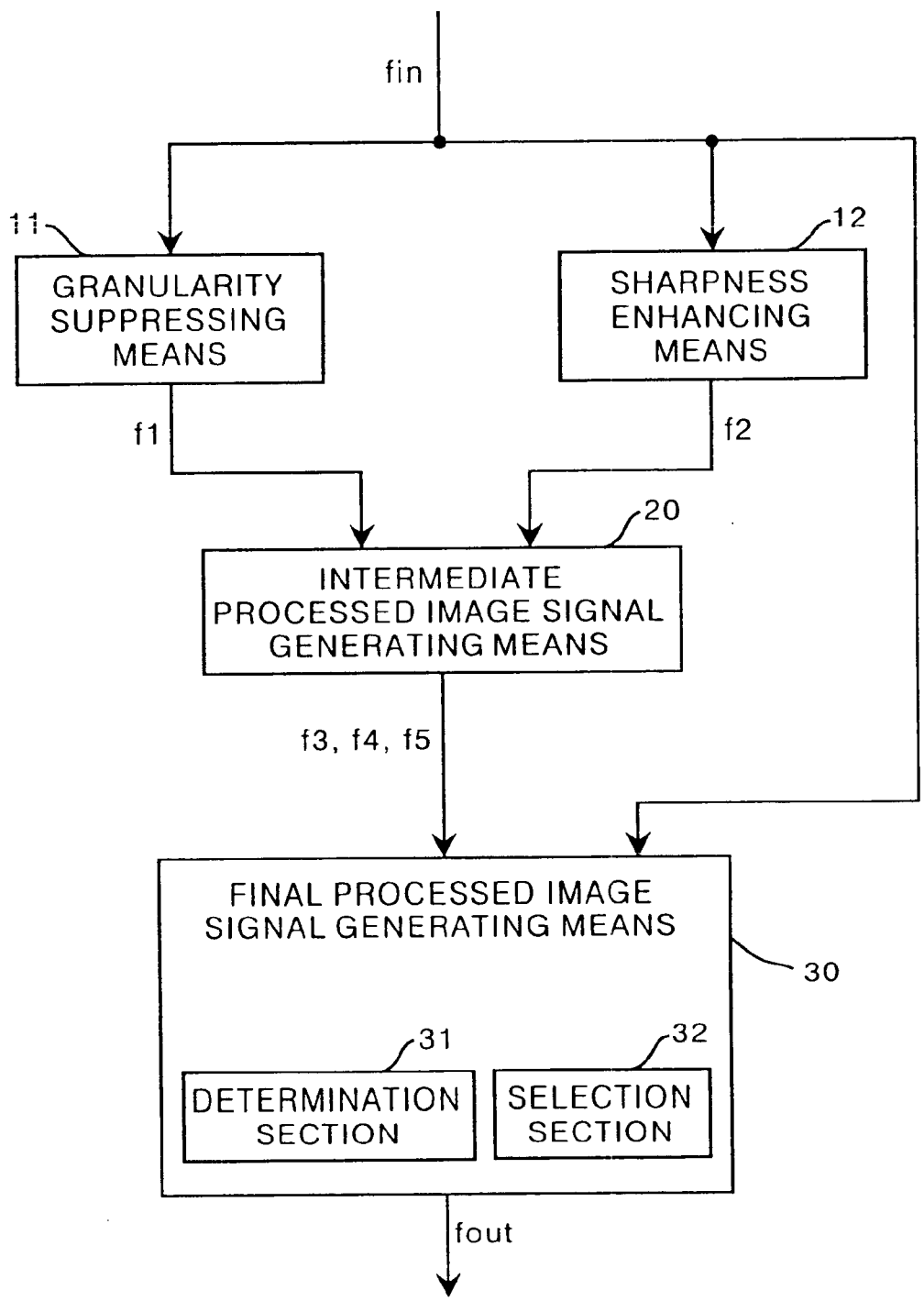
FIG. 12 is a schematic view showing an image processing system for carrying out the method shown in FIG. 11.
Figure 13:
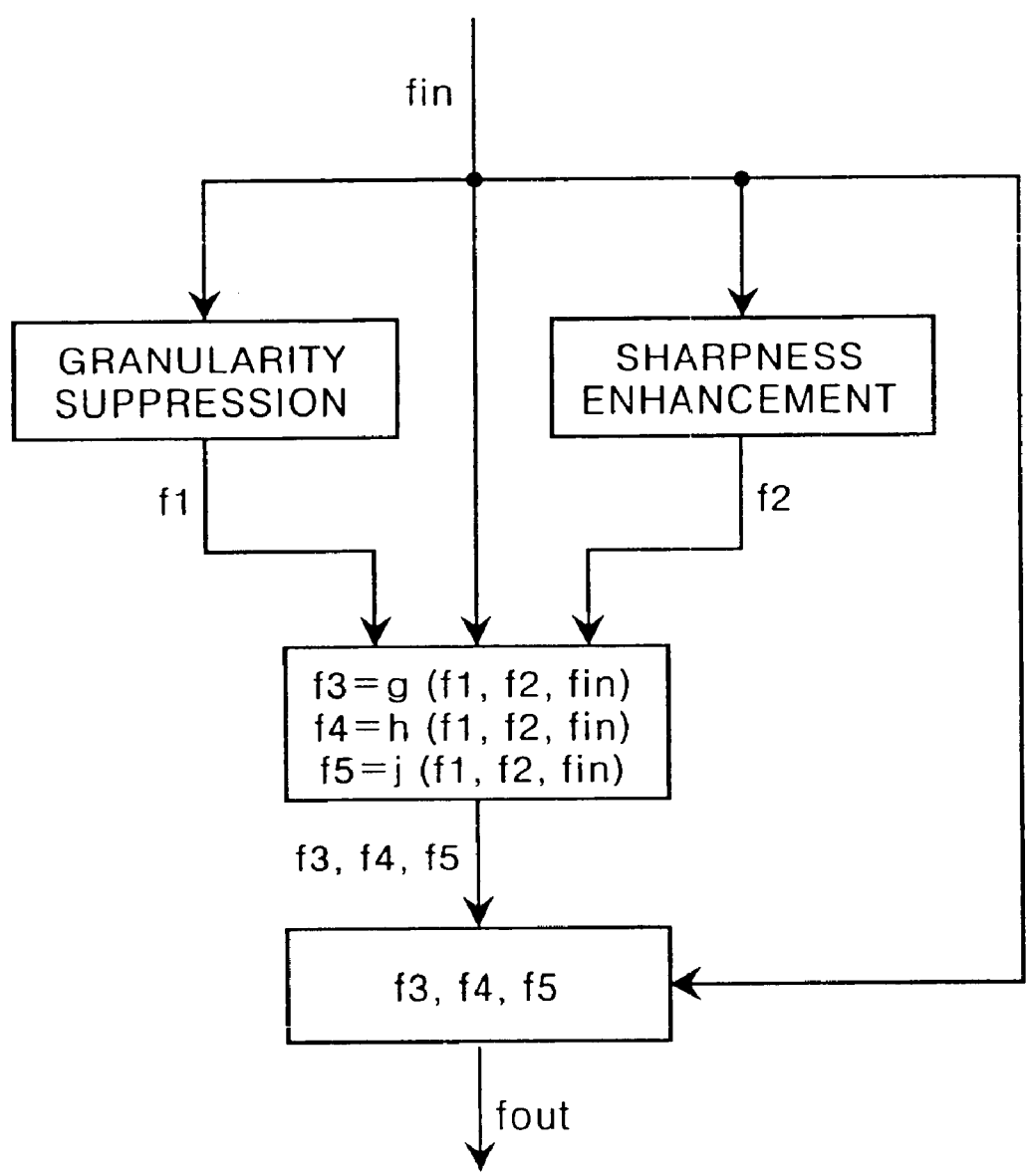
FIG. 13 is a flow chart for illustrating the flow of processing in an image processing method in accordance with a sixth embodiment of the present invention.
Figure 14:
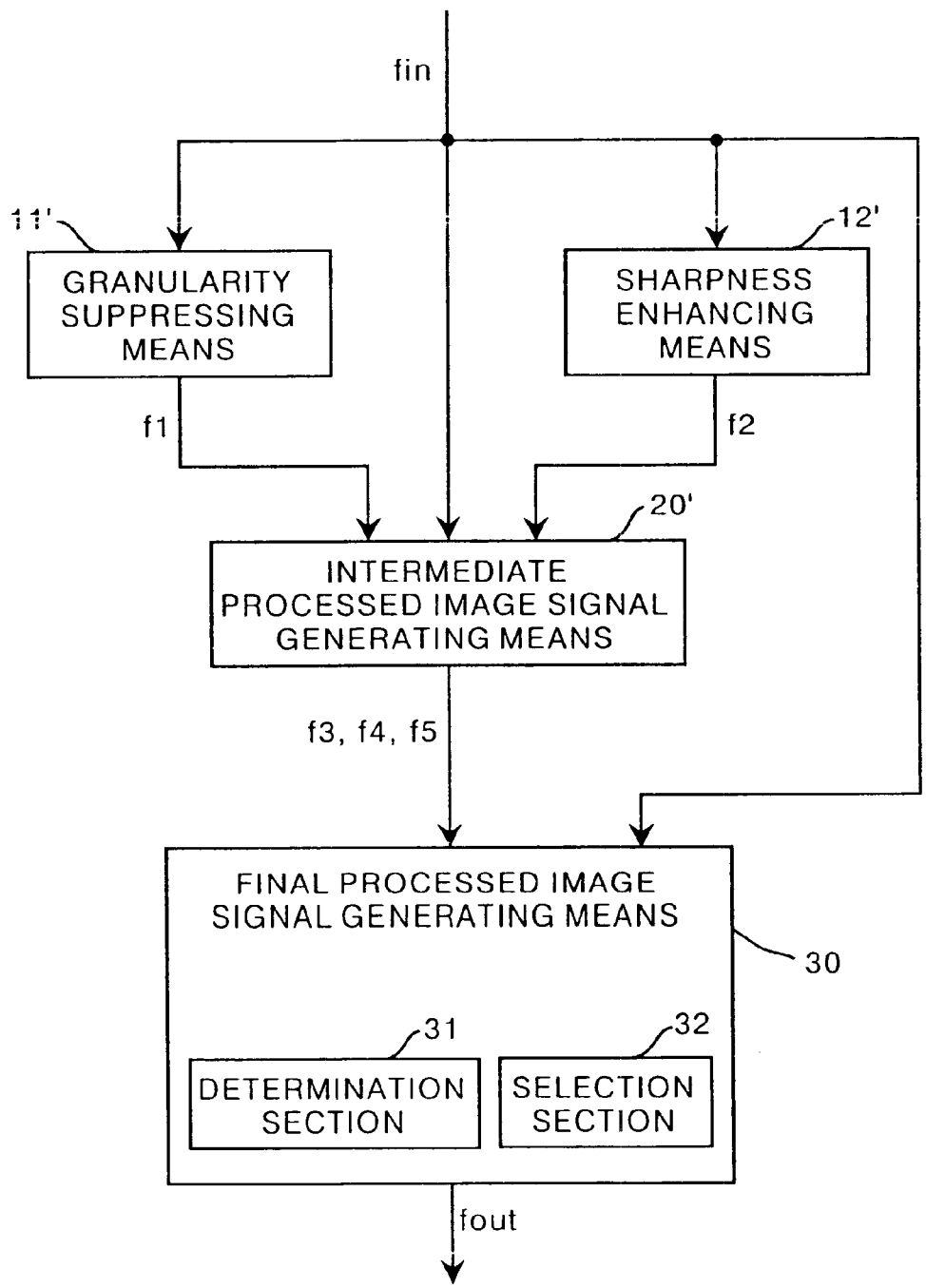
FIG. 14 is a schematic view showing an image processing system for carrying out the method shown in FIG. 13, FIGS. 15A to 15D are views for illustrating a basic operation of morphology operation.

FIG. 13 is a flow chart for illustrating the flow of processing in an image processing method in accordance with a fourth embodiment of the present invention, and FIG. 14 is a schematic view showing an image processing system for carrying out the method shown in FIG. 13. The image processing system shown in FIG. 14 is basically the same as that shown in FIG. 12 except that the original image signal $f_{in}$ is one of a red original image signal $R_{in}$, a green original image signal $G_{in}$ and a blue original image signal $B_{in}$ which are red, green and blue components of a color image signal representing a color image such as taken by use of a digital still camera or photoelectrically read out from a color print or a color film, the intermediate processed image signal generating means 20' generates first and second intermediate processed image signals f3 and f4 by carrying out operation g(f1, f2, $f_{in}$)=f3, and h(f1, f2, $f_{in}$)=f4 based on the granularity-suppressed image signal f1, the sharpness-enhanced image signal f2 and the original image signal $f_{in}$, the granularity suppressing means 11' carries out granularity suppression processing using morphology operation on the original image signal $f_{in}$, and the sharpness enhancing means 12' carries out sharpness enhancement processing in which the original image signal $f_{in}$ is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

For the purpose of simplicity, each of the red original image signal $R_{in}$, the green original image signal $G_{in}$ and the blue original image signal $B_{in}$ will be considered to be an original image signal $f_{in}$, each of granularity-suppressed image signals R1, G1 and B1 respectively obtained from the red original image signal $R_{in}$, the green original image signal $G_{in}$ and the blue original image signal $B_{in}$ will be considered to be a granularity-suppressed image signal f1, each of sharpness-enhanced image signals R2, G2 and B2 respectively obtained from the red original image signal $R_{in}$, the green original image signal $G_{in}$ and the blue original image signal $B_{in}$ will be considered to be a sharpness-enhanced image signal f2, each of intermediate processed image signals G3, R3 and B3 will be considered to be an intermediate processed image signal f3, each of intermediate processed image signals G4, R4 and B4 will be considered to be an intermediate processed image signal f4, each of intermediate processed image signals G5, R5 and B5 will be considered to be an intermediate processed image signal f5, and each of the final processed image signals $R_{out}$, $G_{out}$ and $B_{out}$ will be considered to be a final processed image signal $f_{out}$.

The operation to be performed by the intermediate processed image signal generating means 20' for obtaining the intermediate processed image signals f3 (=g(f1, f2, $f_{in}$)), f4 (=h(f1, f2, $f_{in}$)) and f5(=j(f1, f2, $f_{in}$)) may be weighted addition defined by formulae (16) to (18) with the weighting factors defined by formula (19) to (22) or (23) to (26).

The granularity suppressing means 11', as shown in FIG. 5, comprises an opening processing means 11a which carries out opening processing on the input original image signal $f_{in}$ ($R_{in}$, $G_{in}$, $B_{in}$) and obtains an opening image signal $f_{opn}$ ($R_{opn}$, $G_{opn}$, $B_{opn}$), a closing processing means 11b which carries out closing processing on the input original image signal $f_{in}$ ($R_{in}$, $G_{in}$, $B_{in}$) and obtains a closing image signal $f_{cls}$ ($R_{cls}$, $G_{cls}$, $B_{cls}$), and a morphology MIX means 11c which obtains a granularity-suppressed image signal f1 (R1, G1, B1) according to the aforesaid formula (27) on the basis of the opening image signal $f_{opn}$, the closing image signal $f_{cls}$ and the original image signal $f_{in}$.

The sharpness enhancing means 12' comprises, as shown in FIG. 6, a low-pass filter (LPF) 12a, an operator 12b which extracts an intermediate to high frequency component ($R_{MH}$, $G_{MH}$, $B_{MH}$), a brightness signal extracting means (MTX) 12c which extracts a brightness component $Y_{MH}$ from the intermediate to high frequency component ($R_{MH}$, $G_{MH}$, $B_{MH}$), a low-pass filter 12g, an operator 12h which extracts a high frequency component $Y_H$ of the brightness component $Y_H$, a variable gain amplifier 12i into which the intermediate frequency component $Y_M$ is input, a variable gain amplifier 12j into which the high frequency component $Y_H$ is input, a correlation value calculating means 12d which calculates the correlation value ϵ among red, green and blue of the intermediate to high frequency component ($R_{MH}$, $G_{MH}$, $B_{MH}$), a lookup table (LUT) 12e in which the correlation value ϵ is related to the gain M to the intermediate frequency component $Y_M$, a lookup table (LUT) 12f in which the correlation value ϵ is related to the gain H to the high frequency component $Y_H$, an operator 12k which combines the intermediate frequency component $Y'_M$ output from the variable gain amplifier 12i with the high frequency component $Y'_H$ output from the variable gain amplifier 12j into a combined intermediate to high frequency component $Y'_{MH}$, and an operator 12m which combines the combined intermediate to high frequency component $Y'_{MH}$ with the low frequency component ($R_L$, $R_G$, $R_B$) into a sharpness-enhanced image signal f2 ($R_2$, $G_2$, $B_2$).

The LUT 12e and the LUT 12f are set so that the gain M for a given correlation value ϵ is smaller than the gain H for the given correlation value ϵ up to a predetermined value of the correlation value ϵ.

The granularity-suppressed image signal f1, the sharpness-enhanced image signal f2 and the original image signal $f_{in}$ are input into the intermediate processed image signal generating means 20', and the intermediate processed image signal generating means 20' generates the first and second intermediate processed image signals f3 (R3, G3, B3) and f4 (R4, G4, B4) by carrying out the operation according to formulae (16) to (18).

The intermediate processed image signals f3 and f4 thus obtained are input into the final processed image signal generating means 30 together with the original image signal $f_{in}$, the granularity-suppressed image signal f1 and the sharpness-enhanced image signal f2. The determination section 31 of the final processed image signal generating means 30 determines whether the indicator value $k(f1, f2, f_{in})=(f1-f_{in})\cdot(f2-f_{in})$ is positive or negative and inputs the result of the determination into the selection section 32.

The selection section 32 selects the image signal component of one of the first and second intermediate processed image signals f3 and f4 as the image signal component of the final processed image signal $f_{out}$ on the basis of determination by the determination section 31 according to formula (4), that is, when the indicator value k is not smaller than 0, the selection section 32 outputs the image signal component of the second intermediate processed image signal f4 as the image signal component of the final processed image signal $f_{out}$ and when the indicator value k is smaller than 0, the selection section 32 outputs the image signal component of the first intermediate processed image signal f3 as the image signal component of the final processed image signal $f_{out}$.

Like the final processed image signal $f_{out}$ obtained in the third embodiment, the final processed image signal $f_{out}$ output from the image processing system of this embodiment is an image signal in which the sharpness is enhanced in a region such as an edge portion where the density charge is sharp while the granularity is suppressed to relatively small extent in a low density region in the regions other than the edge portion and the granularity is effectively suppressed in a high density region in the regions other than the edge portion.

As can be understood from the description above, with the image processing system of this embodiment, both the granularity suppression and the sharpness enhancement can be more effectively realized according to the features of portions of the image (whether an edge portion or a flat density portion) as compared with various conventional methods or the systems, and at the same time the degree of granularity suppression can be properly controlled according to the density of the image.

Figure 11:
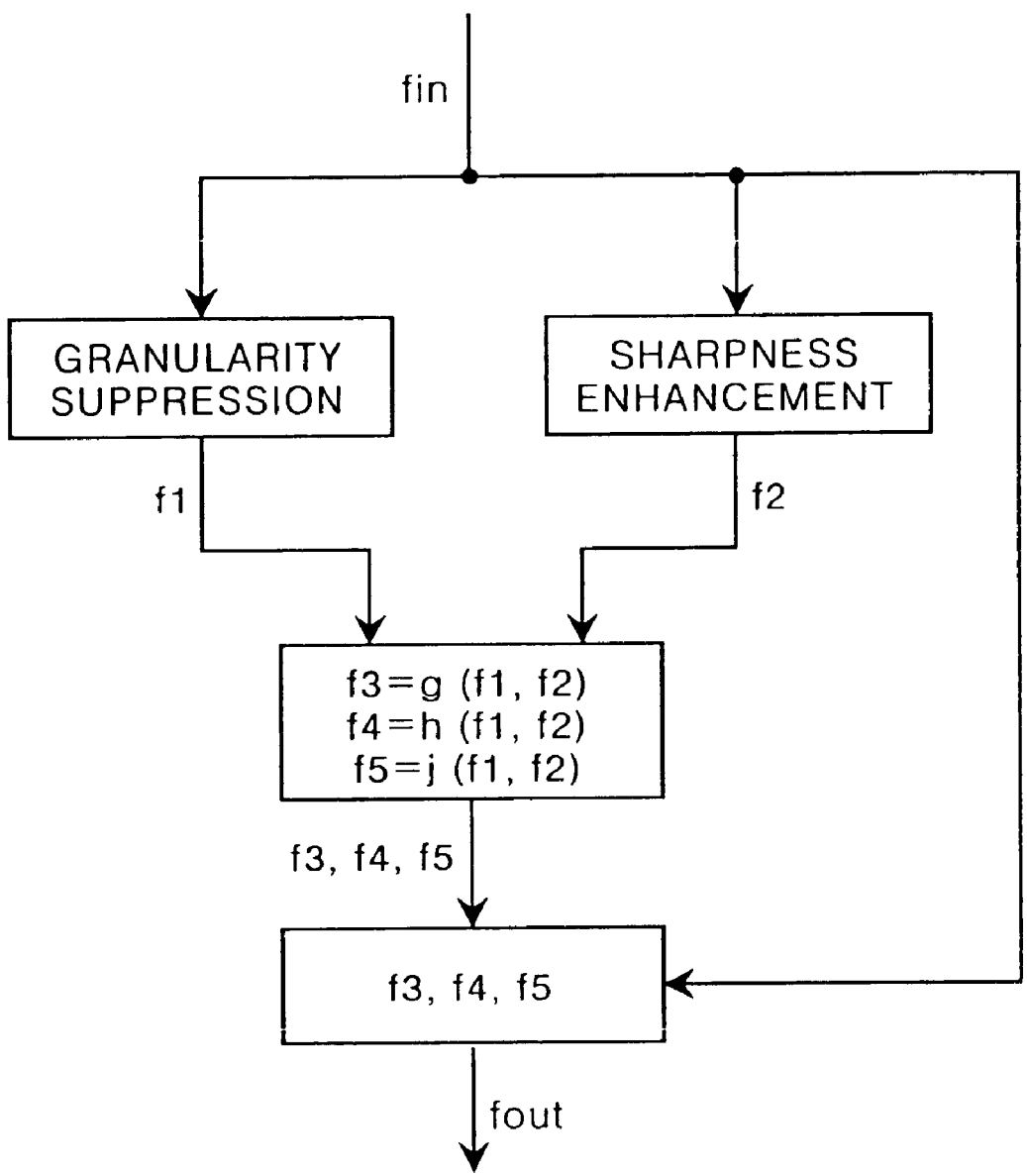
FIG. 11 is a flow chart for illustrating the flow of processing in an image processing method in accordance with a fifth embodiment of the present invention.

Though, in the embodiments described above, the intermediate processed image signal generating means 20 generates first and second intermediate processed image signals f3 and f4 the final processed image signal generating means 30 selects as the final processed image signal $f_{out}$ one of the intermediate processed image signals f3 and f4 and the original image signal $f_{in}$ according to the indicator value k, in the fifth embodiment shown in FIGS. 11 and 12, the intermediate processed image signal generating means 20 generates three different intermediate processed image signals f3, f4 and f5, and the final processed image signal generating means 30 may select as the final processed image signal $f_{out}$ one of the intermediate processed image signals f3, f4, f5 and the original image signal $f_{in}$.

FIG. 11 is a flow chart for illustrating the flow of processing in an image processing method in accordance with the fifth embodiment of the present invention, and FIG. 12 is a schematic view showing an image processing system for carrying out the method shown in FIG. 11.

In FIG. 12, the image processing system for carrying out the image processing method in accordance with the fifth embodiment of the present invention comprises a granularity suppressing means 11 which receives an original image signal $f_{in}$ representing an original image and carries out processing for suppressing granularity on the original image signal $f_{in}$, thereby obtaining a granularity-suppressed image signal f1, a sharpness enhancing means 12 which receives the original image signal $f_{in}$ and carries out processing for enhancing sharpness on the original image signal $f_{in}$, thereby obtaining a sharpness-enhanced image signal f2, an intermediate processed image signal generating means 20 which generates three different (first to third) intermediate processed image signals f3, f4 and f5 by carrying out operation g(f1, f2)=f3, h(f1, f2)=f4, j(f1, f2) based on the granularity-suppressed image signal f1 and the sharpness-enhanced image signal f2 on pixels one by one with the image signal components of the image signals f1 and f2 in one-to-one correspondence with each other, and a final processed image signal generating means 30 which obtains a final processed image signal $f_{out}$ by taking the image signal component of one of the first to third intermediate processed image signals f3, f4 and f5 as the image signal component for each pixel of the final processed image signal $f_{out}$ according to an indicator value $k(f1, f2, f_{in})$ calculated on the basis of the granularity-suppressed image signal f1, the sharpness-enhanced image signal f2 and the original image signal $f_{in}$.

The operations to be performed by the intermediate processed image signal generating means 20 for obtaining the intermediate processed image signals f3 (=g(f1, f2)), f4(=h(f1, f2)) and f5 (j(f1, f2)) are weighted additions defined by the following formulae (16) to (18).

$$f3 = w3a \cdot f1 + w3b \cdot f2 \tag{16}$$

$$f4 = w4a \cdot f1 + w4b \cdot f2 \tag{17}$$

$$f5 = w5a \cdot f1 + w5b \cdot f2 \tag{18}$$

wherein $w3a+w3b=1$ ($0 \leq w3a \leq 1$, $0 \leq w3b \leq 1$), $w4a+w4b=1$ ($0 \leq w4a \leq 1$, $0 \leq w4b \leq 1$), $w5a+w5b=1$ ($0 \leq w5a \leq 1$, $0 \leq w5b \leq 1$), f1 represents the granularity-suppressed image signal, f2 represents the sharpness-enhanced image signal, f3 represents the first intermediate processed image signal, f4 represents the second intermediate processed image signal, and f5 represents the third intermediate processed image signal.

That is, $g(f1, f2) = w3a \cdot f1 + w3b \cdot f2$, $h(f1, f2) = w4a \cdot f1 + w4b \cdot f2$, $j(f1, f2) = w5a \cdot f1 + w5b \cdot f2$.

The values of the weighting factors w4a, w4b, w5a and w5b are set to different values by pixel by pixel according to, for instance, the values of the image signal components of the original image signal $f_{in}$. Specifically, the weighting factors w4a, w4b, w5a and w5b are set according to the following formulae (19) to (22), or the following formulae (23) to (26). According to the formulae (19) to (22), or the formulae (23) to (26), the weighting factors w4a and w5b are increased as the image signal component of the original image signal $f_{in}$ becomes smaller and the weight on the granularity-suppressed image signal f1 becomes larger than that on the sharpness-enhanced image signal f2 in the second intermediate processed image signal f4 and the weight on the sharpness-enhanced image signal f2 becomes larger than that on the granularity-suppressed image signal f1 in the third intermediate processed image signal f5 as the image signal component of the original image signal $f_{in}$ becomes smaller, whereby the second intermediate processed image signal f4 becomes higher in the degree of suppression of the granularity than the third intermediate processed image signal f5.

To the contrast, according to the formulae (19) to (22), or the formulae (23) to (26), the weighting factors w4b and w5a are increased as the image signal component of the original image signal $f_{in}$ becomes larger and the weight on the sharpness-enhanced image signal f2 becomes larger than that on the granularity-suppressed image signal f1 in the second intermediate processed image signal f4 and the weight on the granularity-suppressed image signal f1 becomes larger than that on the sharpness-enhanced image signal f2 in the third intermediate processed image signal f5 as the image signal component of the original image signal $f_{in}$ becomes larger, whereby the third intermediate processed image signal f5 becomes higher in the degree of suppression of the granularity than the second intermediate processed image signal f4. In this case, the first intermediate processed image signal f3 is generated as an image signal having a sharpness between that of the original image signal $f_{in}$ and that of the sharpness-enhanced image signal f2.

The weighting factors w4a, w4b, w5a and w5b set according to formulae (23) to (26) are preferably applied to a region where the granularity is very bad (e.g., extremely underexposed portion).

$$w4a = 1 - (c\alpha + t)/C \quad (19)$$

$$w4b = (c\alpha + t)/C \quad (20)$$

$$w5a = (c\alpha + t)/C \quad (21)$$

$$w5b = 1 - (c\alpha + t)/C \quad (22)$$

wherein
$t = (|f2 - f_{in}|)/\{(|f1 - f_{in}|)(|f2 - f_{in}|)\}$,
$\alpha = f_{in}/f0$,
$f_{in}$ = an original image signal,
f0 = a reference value,
c = a constant, and
C = a constant.

$$w4a = \{c(1-\alpha) + t\}/C \quad (23)$$

$$w4b = 1 - \{c(1-\alpha) + t\}/C \quad (24)$$

$$w5a = 1 - (c\alpha + t)/C \quad (25)$$

$$w5b = (c\alpha + t)/C \quad (26)$$

wherein
$t = (|f2 - f_{in}|)/\{(|f1 - f_{in}|)(|f2 - f_{in}|)\}$,
$\alpha = f_{in}/f0$,
$f_{in}$ = an original image signal,
f0 = a reference value,
c = a constant, and
C = a constant.

In this particular embodiment, as the granularity suppression processing by the granularity suppressing means 11, median filter processing is employed, and as the sharpness enhancing processing, unsharp masking (USM) processing is employed.

The final processed image signal generating means 30 takes the image signal component of one of the first to third intermediate processed image signals f3, f4 and f5 as the image signal component of the final processed image signal $f_{out}$ according to, for instance, the image signal components of the granularity-suppressed image signal f1, the sharpness-enhanced image signal f2 and the original image signal $f_{in}$, e.g, according to whether the indicator value k(f1, f2, $f_{in}$) = (f1 - $f_{in}$)·(f2 - $f_{in}$) is positive or negative and the value of $|f_{in} - f1|$, as represented by the following formula (15) and comprises a determination section 31 which determines whether the indicator value k(f1, f2, $f_{in}$) = (f1 - $f_{in}$)·(f2 - $f_{in}$) is positive or negative and whether $|f_{in} - f1|$ is larger than a predetermined constant Th and a selection section 32 which selects the image signal component of one of the first to third intermediate processed image signal f3, f4 and f5 as the image signal component of the final processed image signal $f_{out}$ on the basis of determination by the determination section 31.

$$f_{out} = \begin{cases} f3 & (\text{when } |fin - f1| \geq Th) \\ f4 & (\text{when } |fin - f1| < Th \text{ and } (f1 - fin) \cdot (f2 - fin) < 0) \\ f5 & (\text{when } |fin - f1| < Th \text{ and } (f1 - fin) \cdot (f2 - fin) \geq 0) \end{cases} \quad (15)$$

wherein $f_{in}$ represents the original image signal, f1 represents the granularity-suppressed image signal, f2 represents the sharpness-enhanced image signal, f3 represents the first intermediate processed image signal, f4 represents the second intermediate processed image signal, f5 represents the third intermediate processed image signal, and Th represents a constant.

Operation of the image processing system of this embodiment will be described, hereinbelow.

First the original image signal $f_{in}$ is separately input into the granularity suppressing means 11 and the sharpness enhancing means 12. The original image signal $f_{in}$ has an edge portion where fluctuation in density is relatively large and a flat density portion where fluctuation in density is relatively small. High frequency noise is superimposed on these density distributions, and the high frequency noise is apt to be remarked especially in the flat density portion.

The granularity suppressing means 11 carries out median filer processing on the original image signal $f_{in}$ and calculates the granularity-suppressed image signal f1. The sharpness enhancing means 12 carries out USM processing on the original image signal $f_{in}$ and calculates the sharpness-enhanced image signal f2. The granularity-suppressed image signal f1 is an image signal where the granularity of the original image signal $f_{in}$ is suppressed and smoothed and the sharpness-enhanced image signal f2 is an image signal where the large density fluctuation portion of the original image signal $f_{in}$ is enhanced.

The granularity-suppressed image signal f1 and the sharpness-enhanced image signal f2 are input into the intermediate processed image signal generating means 20, and the intermediate processed image signal generating means 20 generates the intermediate processed image signals f3, f4 and f5 by carrying out the weighted addition according to formulae (16) to (18) and the formulae (19) to (22) or the formulae (23) to (26) on the basis of the granularity-suppressed image signal f1 and the sharpness-enhanced image signal f2.

The first intermediate processed image signal f3 is generated as an image signal having a sharpness between that of the original image signal $f_{in}$ and that of the sharpness-enhanced image signal f2.

When the weighting factors are calculated according to formulae (19) to (22), the weight on the granularity-suppressed image signal f1 becomes larger than that on the sharpness-enhanced image signal f2 in the second intermediate processed image signal f4 and the weight on the sharpness-enhanced image signal f2 becomes larger than that on the granularity-suppressed image signal f1 in the third intermediate processed image signal f5 as the image signal component of the original image signal $f_{in}$ becomes smaller. To the contrast, according to the formulae (19) to (22), the weight on the sharpness-enhanced image signal f2 becomes larger than that on the granularity-suppressed image signal f1 in the second intermediate processed image signal f4 and the weight on the granularity-suppressed image signal f1 becomes larger than that on the sharpness-enhanced image signal f2 in the third intermediate processed image signal f4 as the image signal component of the original image signal $f_{in}$ becomes larger.

When the weighting factors are calculated according to formulae (23) to (26), the weight on the granularity-suppressed image signal f1 is larger than that on the sharpness-enhanced image signal f2 in either of the second and third intermediate processed image signals f4 and f5 in a region where the image signal components of the original image signal $f_{in}$ are relatively small and the second intermediate processed image signal f4 is higher in the degree of suppression of the granularity than the third intermediate processed image signal f5. Accordingly, the weighting factors calculated according to formulae (23) to (26) are preferably applied to a region where the granularity is very bad.

The intermediate processed image signals f3, f4 and f5 thus obtained are input into the final processed image signal generating means 30. The original image signal $f_{in}$, the granularity-suppressed image signal f1 and the sharpness-enhanced image signal f2 are also input into the final processed image signal generating means 30. The determination section 31 of the final processed image signal generating means 30 determines whether the indicator value $k(f1, f2, f_{in})=(f1-f_{in})\cdot(f2-f_{in})$ is positive or negative and whether $|f_{in}-f1|$ is larger than the constant Th and inputs the result of the determination into the selection section 32.

The selection section 32 selects the image signal component of one of the first to third intermediate processed image signals f3, f4 and f5 as the image signal component of the final processed image signal $f_{out}$ on the basis of determination by the determination section 31 according to formula (15), that is, when ($|f_{in}-f1|$) is not smaller than the predetermined threshold value Th, the selection section 32 outputs the image signal component of the first intermediate processed image signal f3, which relatively high in sharpness as the image signal component of the final processed image signal $f_{out}$, and when the indicator value k is not smaller than 0 with ($|f_{in}-f1|$) is smaller than the threshold value Th, the selection section 32 outputs the image signal component of the third intermediate processed image signal f5 as the image signal component of the final processed image signal $f_{out}$, and when the indicator value k is smaller than 0 with ($|f_{in}-f1|$) is smaller than the threshold value Th, the selection section 32 outputs the image signal component of the second intermediate processed image signal f4 as the image signal component of the final processed image signal $f_{out}$.

When the difference ($|f_{in}-f1|$) between the original image signal $f_{in}$ and the granularity-suppressed image signal f1 is large, for instance, image portions such as an image of catchlights, the first intermediate processed image signal f3 which is relatively high in sharpness is selected, whereby the image portions such as the image of catchlights can be left there and the image can be rich in expression.

Even if, the difference ($|f_{in}-f1|$) is smaller than the threshold value Th, the third intermediate processed image signal f5 is selected if the indicator value k is not smaller than 0 ($k \geq 0$). Since the third intermediate processed image signal f5 is obtained by weighting the sharpness-enhanced image signal f2 more than the granularity-suppressed image signal f1 on the side of the edge portion where the density is lower than the other side according to formulae (21) and (22) or (25) and (26), the third intermediate processed image signal f5 may be considered to be a sharpness-enhanced image signal where the edge portion of the image is enhanced.

On the other hand, at portions other than the edge portion and the like (e.g., flat density portions), the indicator value k is generally smaller than 0 (k<0), and accordingly, the second intermediate processed image signal f4 is selected. As can be seen from formulae (19) and (20) or (23) and (24), though being an image signal which is relatively low in the degree of granularity suppression in a low density region where the granularity is less apt to be remarked, the second intermediate processed image signal f4 may be considered to be an image signal in which the weight on the granularity-suppressed image signal f1 is larger than that on the sharpness-enhanced image signal f2 in a high density region where the granularity is more apt to be remarked and the granularity of the image is effectively suppressed.

As can be understood from the description above, with the image processing system of this embodiment, both the granularity suppression and the sharpness enhancement can be more effectively realized according to the features of portions of the image (whether an edge portion or a flat density portion) as compared with various conventional methods or the systems, and at the same time the degree of granularity suppression can be properly controlled according to the density of the image.

FIG. 13 is a flow chart for illustrating the flow of processing in an image processing method in accordance with a sixth embodiment of the present invention, and FIG. 14 is a schematic view showing an image processing system for carrying out the method shown in FIG. 13. The image processing system shown in FIG. 14 is basically the same as that shown in FIG. 12 except that the original image signal $f_{in}$ is one of a red original image signal $R_{in}$, a green original image signal $G_{in}$ and a blue original image signal $B_{in}$ which are red, green and blue components of a color image signal representing a color image such as taken by use of a digital still camera or photoelectrically read out from a color print or a color film, the intermediate processed image signal generating means 20' generates first to third intermediate processed image signals f3, f4 and f5 by carrying out operation $g(f1, f2, f_{in})=f3$, $h(f1, f2, f_{in})=f4$ and $j(f1, f2, f_{in})=f5$ based on the granularity-suppressed image signal f1, the sharpness-enhanced image signal f2 and the original image signal $f_{in}$, the granularity suppressing means 11' carries out granularity suppression processing using morphology operation on the original image signal $f_{in}$, and the sharpness enhancing means 12' carries out sharpness enhancement processing in which the original image signal $f_{in}$ is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

For the purpose of simplicity, each of the red original image signal $R_{in}$, the green original image signal $G_{in}$ and the blue original image signal $B_{in}$ will be considered to be an original image signal $f_{in}$, each of granularity-suppressed image signals R1, G1 and B1 respectively obtained from the red original image signal $R_{in}$, the green original image signal $G_{in}$ and the blue original image signal $B_{in}$ will be considered to be a granularity-suppressed image signal f1, each of sharpness-enhanced image signals R2, G2 and B2 respectively obtained from the red original image signal $R_{in}$, the green original image signal $G_{in}$ and the blue original image signal $B_{in}$ will be considered to be a sharpness-enhanced image signal f2, each of intermediate processed image signals G3, R3 and B3 will be considered to be an intermediate processed image signal f3, and each of the final processed image signals $R_{out}$, $G_{out}$ and $B_{out}$ will be considered to be a final processed image signal $f_{out}$.

The operation to be performed by the intermediate processed image signal generating means 20' for obtaining the intermediate processed image signals f3 (=g(f1, f2, $f_{in}$)), f4 (=h(f1, f2, $f_{in}$)) and f5 (=j(f1, f2, $f_{in}$)) are weighted additions defined by formulae (16) to (18) with the weighting factors defined by formula (19) to (22) or (23) to (26).

The granularity suppressing means 11', as shown in FIG. 5, comprises an opening processing means 11a which carries out opening processing on the input original image signal $f_{in}$ ($R_{in}$, $G_{in}$, $B_{in}$) and obtains an opening image signal $f_{opn}$ ($R_{opn}$, $G_{opn}$, $B_{opn}$), a closing processing means 11b which carries out closing processing on the input original image signal $f_{in}$ ($R_{in}$, $G_{in}$, $B_{in}$) and obtains a closing image signal $f_{cls}$ ($R_{cls}$, $G_{cls}$, $B_{cls}$), and a morphology MIX means 11c which obtains a granularity-suppressed image signal f1 (R1, G1, B1) according to the aforesaid formula (27) on the basis of the opening image signal $f_{opn}$, the closing image signal $f_{cls}$ and the original image signal $f_{in}$.

The sharpness enhancing means 12' comprises, as shown in FIG. 6, a low-pass filter (LPF) 12a, an operator 12b which extracts an intermediate to high frequency component ($R_{MH}$, $G_{MH}$, $B_{MH}$), a brightness signal extracting means (MTX) 12c which extracts a brightness component $Y_{MH}$ from the intermediate to high frequency component ($R_{MH}$, $G_{MH}$, $B_{MH}$), a low-pass filter 12g, an operator 12h which extracts a high frequency component $Y_H$ of the brightness component $Y_{MH}$, a variable gain amplifier 12i into which the intermediate frequency component $Y_M$ is input, a variable gain amplifier 12j into which the high frequency component $Y_H$ is input, a correlation value calculating means 12d which calculates the correlation value $\epsilon$ among red, green and blue of the intermediate to high frequency component ($R_{MH}$, $G_{MH}$, $B_{MH}$), a lookup table (LUT) 12e in which the correlation value $\epsilon$ is related to the gain M to the intermediate frequency component $Y_M$, a lookup table (LUT) 12f in which the correlation value $\epsilon$ is related to the gain H to the high frequency component $Y_H$, an operator 12k which combines the intermediate frequency component $Y'_M$ output from the variable gain amplifier 12i with the high frequency component $Y'_H$ output from the variable gain amplifier 12j into a combined intermediate to high frequency component $Y'_{MH}$, and an operator 12m which combines the combined intermediate to high frequency component $Y'_{MH}$ with the low frequency component ($R_L$, $R_G$, $R_B$) into a sharpness-enhanced image signal f2 ($R_2$, $G_2$, $B_2$).

The LUT 12e and the LUT 12f are set so that the gain M for a given correlation value $\epsilon$ is smaller than the gain H for the given correlation value $\epsilon$ up to a predetermined value of the correlation value $\epsilon$.

The granularity-suppressed image signal f1, the sharpness-enhanced image signal f2 and the original image signal $f_{in}$ are input into the intermediate processed image signal generating means 20', and the intermediate processed image signal generating means 20' generates the first to third intermediate processed image signals f3 (R3, G3, B3), f4 (R4, G4, B4) and f45(R5, G5, B5) by carrying out the operation according to formulae (16) to (18).

The intermediate processed image signals f3, f4 and f5 thus obtained are input into the final processed image signal generating means 30 together with the original image signal $f_{in}$, the granularity-suppressed image signal f1 and the sharpness-enhanced image signal f2. The determination section 31 of the final processed image signal generating means 30 determines whether the indicator value k(f1, f2, $f_{in}$)=(f1−$f_{in}$)·(f2−$f_{in}$) is positive or negative and whether the difference |$f_{in}$−f1| is larger than the threshold value Th, and inputs the result of the determination into the selection section 32.

The selection section 32 selects the image signal component of one of the first to third intermediate processed image signals f3, f4 and f5 as the image signal component of the final processed image signal $f_{out}$ on the basis of determination by the determination section 31 according to formula (15), that is, when (|$f_{in}$−f1|) is not smaller than the predetermined threshold value Th, the selection section 32 outputs the image signal component of the first intermediate processed image signal f3, which relatively high in sharpness as the image signal component of the final processed image signal $f_{out}$, and when the indicator value k is not smaller than 0 with (|$f_{in}$−f1|) is smaller than the threshold value Th, the selection section 32 outputs the image signal component of the third intermediate processed image signal f5 as the image signal component of the final processed image signal $f_{out}$, and when the indicator value k is smaller than 0 with (|$f_{in}$−f1|) is smaller than the threshold value Th, the selection section 32 outputs the image signal component of the second intermediate processed image signal f4 as the image signal component of the final processed image signal $f_{out}$.

Like the final processed image signal $f_{out}$ obtained in the fifth embodiment, the final processed image signal $f_{out}$ obtained in the sixth embodiment is relatively high in sharpness for image portions such as an image of catchlights so that the texture of the image of catchlights is not deteriorated, is enhanced in sharpness for image portions such as an edge portion where the density change is sharp, is relatively low in the granularity for low density image portions other than the edge portion and the like (e.g., flat density portions), and is effectively suppressed with the granularity for high density image portions.

As can be understood from the description above, with the image processing system of this embodiment, both the granularity suppression and the sharpness enhancement can be more effectively realized according to the features of portions of the image (whether an edge portion or a flat density portion) as compared with various conventional methods or the systems, and at the same time the degree of granularity suppression can be properly controlled according to the density of the image.

It is possible to record the steps of the image processing method of the present invention on a computer-readable recording medium as program for causing a computer to perform the steps.

What is claimed is:

1. An image processing method of processing an original image signal made up of a plurality of image signal components each representing a pixel of an original image and obtaining a final processed image signal, the method comprising the steps of carrying out processing for suppressing granularity and processing for enhancing sharpness separately on the original image signal to obtain a granularity-suppressed image signal and a sharpness-enhanced image signal, obtaining at least one intermediate processed image signal by operation based on at least the granularity-suppressed image signal and the sharpness-enhanced image signal, and taking, as the image signal component for each pixel of the final processed image signal, the image signal component for the corresponding pixel of an image signal selected from the original image signal and the intermediate processed image signal(s) according to an indicator value calculated on the basis of the granularity-suppressed image signal, the sharpness-enhanced image signal and the original image signal.

2. An image processing method as defined in claim 1 in which a single intermediate processed image signal is obtained and, as the image signal component for each pixel of the final processed image signal, the image signal component for the corresponding pixel of one of the intermediate processed image signal and the original image signal is taken according to processing defined by the following formula (1), $$f_{out} = \begin{cases} f_{in} & \text{(when } (f1-f_{in})\cdot(f2-f_{in}) < 0), \\ f3 & \text{(when } (f1-f_{in})\cdot(f2-f_{in}) \geq 0) \end{cases} \quad (1)$$

wherein $f_{in}$ represents the original image signal, f1 represents the granularity-suppressed image signal, f2 represents the sharpness-enhanced image signal, and f3 represents the intermediate processed image signal.

3. An image processing method as defined in claim 1 in which a single intermediate processed image signal is obtained and the operation for obtaining the intermediate processed image signal is defined by the following formula (2), $$f3 = w1\cdot f1 + w2\cdot f2 \quad (2)$$

wherein w1+w2=1 (0<w1<1, 0<w2<1), f1 represents the granularity-suppressed image signal, f2 represents the sharpness-enhanced image signal and f3 represents the intermediate processed image signal.

4. An image processing method as defined in claim 1 in which a single intermediate processed image signal is obtained and the operation for obtaining the intermediate processed image signal is defined by the following formula (3), $$f3 = \{|f1-f_{in}|(f1-f_{in}) + |f2-f_{in}|(f2-f_{in})\}/\{|f1-f_{in}|+|f2-f_{in}|\} + f_{in} \quad (3)$$

wherein $f_{in}$ represents the original image signal, ff represents the granularity-suppressed image signal, f2 represents the sharpness-enhanced image signal and f3 represents the intermediate processed image signal.

5. An image processing method as defined in claim 1 in which first and second intermediate processed image signals are obtained and, as the image signal component for each pixel of the final processed image signal, the image signal component for the corresponding pixel of an image signal selected from the intermediate processed image signals and the original image signal is taken according to processing defined by the following formula (4), $$f_{out} = \begin{cases} f3 & \text{(when } (f1-f_{in})\cdot(f2-f_{in}) < 0), \\ f4 & \text{(when } (f1-f_{in})\cdot(f2-f_{in}) \geq 0) \end{cases} \quad (4)$$

wherein $f_{in}$ represents the original image signal, f1 represents the granularity-suppressed image signal, f2 represents the sharpness-enhanced image signal, f3 represents the first intermediate processed image signal, and f4 represents the second intermediate processed image signal.

6. An image processing method as defined in claim 1 in which first and second intermediate processed image signals are obtained and the operation for obtaining the intermediate processed image signal is defined by the following formulae (5) and (6), $$f3 = w1a\cdot f1 + w1b\cdot f2 \quad (5)$$

$$f4 = w2a\cdot f1 + w2b\cdot f2 \quad (6)$$

wherein w1a+w1b=1 (0≤w1a≤1, 0≤w1b≤1), w2a+w2b=1 (0≤w2a≤1, 0≤w2b≤1), f1 represents the granularity-suppressed image signal, f2 represents the sharpness-enhanced image signal, f3 represents the first intermediate processed image signal, and f4 represents the second intermediate processed image signal.

7. An image processing method as defined in claim 6 in which the weighting factors w1a, w1b, w2a and w2b are defined by the following formulae (7) to (10), $$w1a = 1 - (c\alpha + t)/C \quad (7)$$

$$w1b = (c\alpha + t)/C \quad (8)$$

$$w2a = (c\alpha + t)/C \quad (9)$$

$$w2b = 1 - (c\alpha + t)/C \quad (10)$$

wherein $t = (|f2-f_{in}|)/\{(|f1-f_{in}|)(|f2-f_{in}|)\}$, $\alpha = f_{in}/f0$, $f_{in}$ represents the original image signal, f0 represents a reference value, c represents a constant, and C represents a constant.

8. An image processing method as defined in claim 6 in which the weighting factors w1a, w1b, w2a and w2b are defined by the following formulae (11) to (14), $$w1a = \{c(1-\alpha) + t\}/C \quad (11)$$

$$w1b = 1 - \{c(1-\alpha) + t\}/C \quad (12)$$

$$w2a = 1 - (c\alpha + t)/C \quad (13)$$

$$w2b = (c\alpha + t)/C \quad (14)$$

wherein $t = (|f2-f_{in}|)/\{(|f1-f_{in}|)(|f2-f_{in}|)\}$, $\alpha = f_{in}/f0$, $f_{in}$ represents the original image signal, f0 represents a reference value, c represents a constant, and C represents a constant.

9. An image processing method as defined in claim 1 in which first to third intermediate processed image signals are obtained and, as the image signal component for each pixel of the final processed image signal, the image signal component for the corresponding pixel of an image signal selected from the intermediate processed image signals and the original image signal is taken according to processing defined by the following formula (15), $$f_{out} = \begin{cases} f3 & \text{(when } |fin - f1| \geq Th) \\ f4 & \text{(when } |fin - f1| < Th \text{ and } (f1-fin)\cdot(f2-fin) < 0) \\ f5 & \text{(when } |fin - f1| < Th \text{ and } (f1-fin)\cdot(f2-fin) \geq 0) \end{cases} \quad (15)$$

wherein $f_{in}$ represents the original image signal, f1 represents the granularity-suppressed image signal, f2 represents the sharpness-enhanced image signal, f3 represents the first intermediate processed image signal, f4 represents the second intermediate processed image signal, f5 represents the third intermediate processed image signal, and Th represents a constant.

10. An image processing method as defined in claim 1 in which first to third intermediate processed image signals are obtained and the operation for obtaining the intermediate processed image signals is defined by the following formulae (16) to (18), $$f3 = w3a\cdot f1 + w3b\cdot f2 \quad (16)$$

$$f4 = w4a\cdot f1 + w4b\cdot f2 \quad (17)$$

$$f5 = w5a\cdot f1 + w5b\cdot f2 \quad (18)$$

wherein w3a+w3b=1 (0≤w3a≤1, 0≤w3b≤1), w4a+w4b=1 (0≤w4a≤1, 0≤w4b≤1), w5a+w5b=1 (0≤w5a≤1, 0≤w5b≤1), f1 represents the granularity-suppressed image signal, f2 represents the sharpness-enhanced image signal, f3 represents the first intermediate processed image signal, f4 represents the second intermediate processed image signal, and f5 represents the third intermediate processed image signal.

11. An image processing method as defined in claim 10 in which the weighting factors w4a, w4b, w5a and w5b are defined by the following formulae (19) to (22), $$w4a = 1-(c\alpha+t)/C \quad (19)$$

$$w4b = (c\alpha+t)/C \quad (20)$$

$$w5a = (c\alpha+t)/C \quad (21)$$

$$w5b = 1-(c\alpha+t)/C \quad (22)$$

wherein $t=(|f2-f_{in}|)/\{(|f1-f_{in}|)(|f2-f_{in}|)\}$, $\alpha=f_{in}/f0$, $f_{in}$ represents an original image signal, f0 represents a reference value, c represents a constant, and C represents a constant.

12. An image processing method as defined in claim 10 in which the weighting factors w4a, w4b, w5a and w5b are defined by the following formulae (23) to (26), $$w4a = \{c(1-\alpha)+t\}/C \quad (23)$$

$$w4b = 1-\{c(1-\alpha)+t\}/C \quad (24)$$

$$w5a = 1-(c\alpha+t)/C \quad (25)$$

$$w5b = (c\alpha+t)/C \quad (26)$$

wherein $t=(|f2-f_{in}|)/\{(|f1-f_{in}|)(|f2-f_{in}|)\}$, $\alpha=f_{in}/f0$, $f_{in}$ represents an original image signal, f0 represents a reference value, c represents a constant, and C represents a constant.

13. An image processing method as defined in claim 1 in which the step of carrying out processing for suppressing granularity involves granularity suppressing processing using morphology operation and the step of carrying out processing for enhancing sharpness involves processing in which the original image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

14. An image processing method as defined in claim 13 in which the granularity suppressing processing using morphology operation is defined by the following formula (27), $$f1 = \begin{cases} f_{opn} & (\text{when } f_{cls} = f_{in}) \\ f_{cls} & (\text{when } f_{opn} = f_{in}) \\ (f_{opn}+f_{cls})/2 & (\text{when } f_{cls} \neq f_{in}, \text{ and } f_{opn} \neq f_{in}) \end{cases} \quad (27)$$

wherein f1 represents the granularity-suppressed image signal, $f_{cls}$ represents a closing image signal, $f_{opn}$ represents an opening image signal, and $f_{in}$ represents the original image signal.

15. An image processing system for processing an original image signal made up of a plurality of image signal components each representing a pixel of an original image and obtaining a final processed image signal, the system comprising a granularity suppressing means which carries out processing for suppressing granularity on the original image signal and obtains a granularity-suppressed image signal, a sharpness enhancing means which carries out processing for enhancing sharpness on the original image signal and obtains sharpness-enhanced image signal, an intermediate processed image signal generating means which generates at least one intermediate processed image signal by operation based on at least the granularity-suppressed image signal and the sharpness-enhanced image signal, and a final processed image signal generating means which obtains a final processed image signal by taking, as the image signal component for each pixel of the final processed image signal, the image signal component for the corresponding pixel of an image signal selected from the intermediate processed image signals and the original image signal according to an indicator value calculated on the basis of the granularity-suppressed image signal, the sharpness-enhanced image signal and the original image signal.

16. An image processing system as defined in claim 15 in which the intermediate processed image signal generating means generates a single intermediate processed image signal and the final processed image signal generating means takes, as the image signal component for each pixel of the final processed image signal, the image signal component for the corresponding pixel of an image signal selected from the intermediate processed image signals and the original image signal according to processing defined by the following formula (1), $$f_{out} = \begin{cases} f_{in} & (\text{when } (f1-f_{in}) \cdot (f2-f_{in}) < 0), \\ f3 & (\text{when } (f1-f_{in}) \cdot (f2-f_{in}) \geq 0) \end{cases} \quad (1)$$

wherein $f_{in}$ represents the original image signal, f1 represents the granularity-suppressed image signal, f2 represents the sharpness-enhanced image signal, and f3 represents the intermediate processed image signal.

17. An image processing system as defined in claim 15 in which the intermediate processed image signal generating means generates a single intermediate processed image signal according to the operation defined by the following formula (2), $$f3 = w1 \cdot f1 + w2 \cdot f2 \quad (2)$$

wherein w1+w2=1 (0<w1<1, 0<w2<1), f1 represents the granularity-suppressed image signal, f2 represents the sharpness-enhanced image signal and f3 represents the intermediate processed image signal.

18. An image processing system as defined in claim 15 in which the intermediate processed image signal generating means generates a single intermediate processed image signal according to the operation defined by the following formula (3), $$f3 = \{|f1-f_{in}|(f1-f_{in})+|f2-f_{in}|(f2-f_{in})\}/\{|f1-f_{in}|+|f2-f_{in}|\}+f_{in} \quad (3)$$

wherein $f_{in}$ represents the original image signal, f1 represents the granularity-suppressed image signal, f2 represents the sharpness-enhanced image signal and f3 represents the intermediate processed image signal.

19. An image processing system as defined in claim 15 in which the intermediate processed image signal generating means generated first and second intermediate processed image signals and the final processed image signal generating means takes, as the image signal component for each pixel of the final processed image signal, the image signal component for the corresponding pixel of an image signal selected from the intermediate processed image signals and the original image signal according to processing defined by the following formula (4), $$f_{out} = \begin{cases} f3 & \text{(when } (f1-f_{in})\cdot(f2-f_{in}) < 0), \\ f4 & \text{(when } (f1-f_{in})\cdot(f2-f_{in}) \geq 0) \end{cases} \quad (4)$$

wherein $f_{in}$ represents the original image signal, f1 represents the granularity-suppressed image signal, f2 represents the sharpness-enhanced image signal, f3 represents the first intermediate processed image signal, and f4 represents the second intermediate processed image signal.

20. An image processing system as defined in claim 15 in which the intermediate processed image signal generating means generates first and second intermediate processed image signals according to the operation defined by the following formulae (5) and (6), $$f3 = w1a \cdot f1 + w1b \cdot f2 \quad (5)$$

$$f4 = w2a \cdot f1 + w2b \cdot f2 \quad (6)$$

wherein $w1a + w1b = 1$ ($0 \leq w1a \leq 1$, $0 \leq w1b \leq 1$), $w2a + w2b = 1$ ($0 \leq w2a \leq 1$, $0 \leq w2b \leq 1$), f1 represents the granularity-suppressed image signal, f2 represents the sharpness-enhanced image signal, f3 represents the first intermediate processed image signal, and f4 represents the second intermediate processed image signal.

21. An image processing system as defined in claim 20 in which the weighting factors w1a, w1b, w2a and w2b are defined by the following formulae (7) to (10), $$w1a = 1 - (c\alpha + t)/C \quad (7)$$

$$w1b = (c\alpha + t)/C \quad (8)$$

$$w2a = (c\alpha + t)/C \quad (9)$$

$$w2b = 1 - (c\alpha + t)/C \quad (10)$$

wherein $t = (|f2 - f_{in}|) / \{(|f1 - f_{in}|)(|f2 - f_{in}|)\}$, $\alpha = f_{in}/f0$, $f_{in}$ represents the original image signal, f0 represents a reference value, c represents a constant, and C represents a constant.

22. An image processing system as defined in claim 20 in which the weighting factors w1a, w1b, w2a and w2b are defined by the following formulae (11) to (14), $$w1a = \{c(1-\alpha) + t\}/C \quad (11)$$

$$w1b = 1 - \{c(1-\alpha) + t\}/C \quad (12)$$

$$w2a = 1 - (c\alpha + t)/C \quad (13)$$

$$w2b = (c\alpha + t)/C \quad (14)$$

wherein $t = (|f2 - f_{in}|) / \{(|f1 - f_{in}|)(|f2 - f_{in}|)\}$, $\alpha = f_{in}/f0$, $f_{in}$ represents the original image signal, f0 represents a reference value, c represents a constant, and C represents a constant.

23. An image processing system as defined in claim 15 in which the intermediate processed image signal generating means generates first to third intermediate processed image signals and the final processed image signal generating means takes, as the image signal component for each pixel of the final processed image signal, the image signal component for the corresponding pixel of an image signal selected from the intermediate processed image signals and the original image signal according to the processing defined by the following formula (15), $$f_{out} = \begin{cases} f3 & \text{(when } |fin - f1| \geq Th) \\ f4 & \text{(when } |fin - f1| < Th \text{ and } (f1 - fin)\cdot(f2 - fin) < 0) \\ f5 & \text{(when } |fin - f1| < Th \text{ and } (f1 - fin)\cdot(f2 - fin) \geq 0) \end{cases} \quad (15)$$

wherein $f_{in}$ represents the original image signal, f1 represents the granularity-suppressed image signal, f2 represents the sharpness-enhanced image signal, f3 represents the first intermediate processed image signal, f4 represents the second intermediate processed image signal, f5 represents the third intermediate processed image signal, and Th represents a constant.

24. An image processing system as defined in claim 15 in which the intermediate processed image signal generating means generates first to third intermediate processed image signals according to the operation defined by the following formulae (16) to (18), $$f3 = w3a \cdot f1 + w3b \cdot f2 \quad (16)$$

$$f4 = w4a \cdot f1 + w4b \cdot f2 \quad (17)$$

$$f5 = w5a \cdot f1 + w5b \cdot f2 \quad (18)$$

wherein $w3a + w3b = 1$ ($0 \leq w3a \leq 1$, $0 \leq w3b \leq 1$), $w4a + w4b = 1$ ($0 \leq w4a \leq 1$, $0 \leq w4b \leq 1$), $w5a + w5b = 1$ ($0 \leq w5a \leq 1$, $0 \leq w5b \leq 1$), f1 represents the granularity-suppressed image signal, f2 represents the sharpness-enhanced image signal, f3 represents the first intermediate processed image signal, f4 represents the second intermediate processed image signal, and f5 represents the third intermediate processed image signal.

25. An image processing system as defined in claim 24 in which the weighting factors w4a, w4b, w5a and w5b are defined by the following formulae (19) to (22), $$w4a = 1 - (c\alpha + t)/C \quad (19)$$

$$w4b = (c\alpha + t)/C \quad (20)$$

$$w5a = (c\alpha + t)/C \quad (21)$$

$$w5b = 1 - (c\alpha + t)/C \quad (22)$$

wherein $t = (|f2 - f_{in}|) / \{(|f1 - f_{in}|)(|f2 - f_{in}|)\}$, $\alpha = f_{in}/f0$, $f_{in}$ represents an original image signal, f0 represents a reference value, c represents a constant, and C represents a constant.

26. An image processing method as defined in claim 24 in which the weighting factors w4a, w4b, w5a and w5b are defined by the following formulae (23) to (26), $$w4a = \{c(1-\alpha) + t\}/C \quad (23)$$

$$w4b = 1 - \{c(1-\alpha) + t\}/C \quad (24)$$

$$w5a = 1 - (c\alpha + t)/C \quad (25)$$

$$w5b = (c\alpha + t)/C \quad (26)$$

wherein $t = (|f2 - f_{in}|) / \{(|f1 - f_{in}|)(|f2 - f_{in}|)\}$, $\alpha = f_{in}/f0$, $f_{in}$ represents an original image signal, f0 represents a reference value, c represents a constant, and C represents a constant.

27. An image processing system as defined in claim 15 in which the processing for suppressing granularity by the granularity suppressing means involves granularity suppressing processing using morphology operation and the processing for enhancing sharpness by the sharpness enhancing means involves processing in which the original image signal is separated into a low frequency component, an intermediate frequency component and a high frequency component, the high frequency component is enhanced while the intermediate frequency component is suppressed, and the processed high frequency component, the processed intermediate frequency component and the low frequency component are combined into an image signal.

28. An image processing system as defined in claim 27 in which the granularity suppressing processing using morphology operation is defined by the following formula (27), $$f1 = \begin{cases} f_{opn} & (\text{when } f_{cls} = f_{in}) \\ f_{cls} & (\text{when } f_{opn} = f_{in}) \\ (f_{opn} + f_{cls})/2 & (\text{when } f_{cls} \neq f_{in}, \text{ and } f_{opn} \neq f_{in}) \end{cases} \quad (27)$$

wherein f1 represents the granularity-suppressed image signal, $f_{cls}$ represents a closing image signal, $f_{opn}$ represents an opening image signal, and $f_{in}$ represents the original image signal.

* * * * *